United States Patent
Schweid et al.

[19]

[11] Patent Number: 6,132,326

[45] Date of Patent: Oct. 17, 2000

[54] SPORTS IMPLEMENT CUSTOMIZING SYSTEM

[75] Inventors: Jay M. Schweid, Pound Ridge; Joseph J. Trocchia, Garden City; Theodore J. Newman, Forest Hills, all of N.Y.

[73] Assignees: Jay Schweid, Inc., Pound Ridge; T.J. Associates, Inc., Garden City, both of N.Y.

[21] Appl. No.: 08/935,859

[22] Filed: Sep. 23, 1997

[51] Int. Cl.[7] .................................................. A63B 59/00
[52] U.S. Cl. .......................................... 473/553; 73/65.03
[58] Field of Search ................................... 473/524, 553, 473/537, 555, 564, 282, 287, 292, 407, 409; 73/65.03, 579, 862.43, 862.452, 862.381, 862.51

[56] References Cited

U.S. PATENT DOCUMENTS

| | | | |
|---|---|---|---|
| 3,964,291 | 6/1976 | Ogden | 73/1 B |
| 4,043,184 | 8/1977 | Sayers | 73/65.03 |
| 4,212,193 | 7/1980 | Turley | 73/65.03 |
| 4,488,444 | 12/1984 | Weidmann et al. | 73/862.452 |
| 4,523,759 | 6/1985 | Igarashi | 273/169 |
| 4,599,898 | 7/1986 | Beer | 73/579 |
| 4,747,314 | 5/1988 | Huang | 73/862.45 |
| 4,876,658 | 10/1989 | Haas | 364/550 |
| 5,269,177 | 12/1993 | Miggins et al. | 73/65.03 |
| 5,351,951 | 10/1994 | Hodgetts | 273/77 |
| 5,396,436 | 3/1995 | Parker et al. | 364/508 |
| 5,515,717 | 5/1996 | White | 73/65.03 |
| 5,528,927 | 6/1996 | Butler et al. | 73/65.03 |
| 5,616,832 | 4/1997 | Nauck | 73/65.03 |
| 5,672,809 | 9/1997 | Brandt | 73/65.03 |
| 5,703,294 | 12/1997 | McConnell et al. | 73/579 |
| 5,721,399 | 2/1998 | Latiri | 73/65.03 |
| 5,988,861 | 11/1999 | Baum | 73/65.03 |

*Primary Examiner*—Valencia Martin-Wallace
*Assistant Examiner*—John Paradiso
*Attorney, Agent, or Firm*—Fitzpatrick, Cella, Harper & Scinto

[57] ABSTRACT

The weight, balance point and swing weight of a sports implement such as a tennis racket can be automatically duplicated using a measuring unit and a computer program that uses data supplied by the measuring unit and data prestored in a database. The measuring unit measures the total weight of a raw tennis racket, the force it exerts when supported by the balance and a fixed point, and the period of oscillation of the tennis racket when swung as a pendulum. The computer calculates the weight of a molded handle to be formed on the raw racket and the weight and location of lead weights to be added to a finished racket made from the raw racket so that the finished racket meets the specifications prestored in the computer. The system thus enables a particular racket to be duplicated by matching the properties of the finished racket with prestored specifications of the particular racket.

42 Claims, 10 Drawing Sheets

SPORTS IMPLEMENT CUSTOMIZING SYSTEM

BACKGROUND OF THE INVENTION

1. Field of the Invention

The present invention relates to a system for customizing a sports implement and, more particularly, to a system for customizing various properties relating to the weight and mass distribution of such an implement.

2. Description of the Prior Art

Many sports, such as tennis, golf and baseball, to name a few, require the use of an implement. In sports such as these where the implement is moved by the player to strike a ball, the weight and mass distribution properties of the implement are very important. Not only are those properties themselves of interest to the player, but the ability to duplicate them from one implement to the next can also be important.

The more skilled the player, the more critical it is to be able to control the properties of the implement to within very close limits. For example, in tennis the top players strive not only to find a racket that has properties they like but also to duplicate those properties from one racket to the next. The player may in fact not even understand the physics underlying his or her preferences, expressing them only in terms such as the "feel" of the racket. However, the ability to control the physical properties that impart a particular "feel" is highly desirable in tennis (as well as other sports).

In actuality, the physical properties that top players experience as "feel" are attributable largely to three physical parameters. They are weight, the location of the center of gravity or mass centroid (also called "balance" or "balance point") and moment of inertia (also called "swing weight"). The very best players can detect tiny differences in these properties from one racket to the next, and they are notoriously difficult to reproduce from racket to racket. There are those with sufficient skill and experience to customize a racket with a "feel" that duplicates that of an existing racket, but it is largely an art not easily taught, rather than a science with results that can be repeated independently of an individual racket customizer's skill.

The best system would be one that enabled perfect duplication of the "feel" of a particularly favorite racket of any given player. The difficulty in achieving that goal arises from the fact that even two identical model rackets from the same manufacturer have slight differences that a top player can detect. The differences are attributable in part to variations in the racket blank as manufactured, but they are also due to variations introduced when the handle, grip, overwrap and other components are put on the racket blank to customize the finished racket.

Of course, duplicating racket weight is trivial, since it requires only a scale to weigh the racket and then changing the weight to a desired value using conventional lead tape adhered to the racket frame. There are commercially available machines that measure racket balance as well. Again, it is easy to manipulate balance (center of gravity) also by using lead tape. However, adding weight to adjust the center of gravity will change the weight, and vice versa, and it is this aspect of racket customizing that makes it difficult to duplicate a racket's properties.

Moreover, if swing weight (moment of inertia) is also to be duplicated, another measurement and another criteria for distributing the weight in the racket is added. In that regard, there is no known prior art that provides a simple yet accurate measurement of swing weight together with the ability to customize a racket such that it has a particular desired swing weight. For example, the results achieved with one known machine for measuring swing weight are dependent on the individual operator using the machine. In addition, that machine has inherent inaccuracies because it uses springs, which are dependent on environmental influences and experience changes in their properties over time.

Accordingly, up to now it has been difficult, although possible, to produce a finished racket with the same weight and balance as a reference racket. That is, although there are those who can sometimes produce a racket with a given weight and balance, the ability to do so depends almost exclusively on the skill of the individual undertaking the task. As for duplicating swing weight, the difficulty in accurately measuring this parameter, not to mention the near impossibility of duplicating a reference racket's swing weight as well as its weight and balance, has largely led to those skilled in the art ignoring it as a parameter in racket customizing.

Therefore, even though a player might not appreciate why, to have a favorite racket's feel accurately reproduced has been largely a matter of chance, depending on whether the racket customizer chosen by the player was sufficiently lucky or skilled to have been able to duplicate all three major physical properties contributing to the feel of a reference racket supplied to the customizer by the player.

SUMMARY OF THE INVENTION

Accordingly, it is an object of the invention to provide a system that can accurately measure the weight and balance of a sports implement and enable quick and reliable production of another implement with the identical weight and balance.

It is another object of the invention to provide a system that can optionally also measure the swing weight of a sports implement and enable quick and reliable production of a like implement with the identical weight, balance and swing weight.

In accordance with an embodiment of the invention, a system for customizing a sports implement comprises a measuring unit including an electronic balance for providing an electrical signal indicative of a weight exerted on the balance, a first implement support on the balance, a second implement support disposed a predetermined distance from the first implement support, and a reference member for locating a part of said sports implement at a predetermined position relative to the first and second implement supports, and a calculation circuit for determining from the electrical signal the weight of the sports implement when the sports implement is supported by the balance and the distance from the part of the sports implement to the mass centroid thereof when the sports implement is supported by the first and second implement supports after the part of the sports implement is located at the predetermined position using the reference member.

In accordance with a variation of that embodiment, the system further comprises a pendulum unit for holding the sports implement for oscillation as a pendulum, and an output device for providing to the calculation circuit an electrical signal indicative of the period of oscillation of the sports implement, wherein the calculation circuit calculates a moment of inertia of the sports implement using the period of oscillation of the sports implement, the weight of the sports implement and the distance from the part of the sports implement to the mass centroid thereof.

In accordance with another embodiment of the invention, a system for customizing a tennis racket comprises:

a measuring unit including an electronic balance mounted to the measuring unit for providing an electrical signal indicative of a weight placed on the balance, a forward racket support on the balance and having a sharp edge for supporting a portion of the tennis racket remote from the handle thereof, a rear racket support with a sharp edge disposed a predetermined distance from the forward racket support for supporting the handle of the tennis racket, and a reference member mounted for movement between an operative position in contact with the butt end of the handle for locating said butt end a predetermined distance from the front and rear racket supports and a retracted position out of contact with the butt end, a pendulum unit including a pendulum bracket mounted for rotation about a pendulum shaft, the pendulum bracket including a positioning bar and a clamping member for clamping the handle of the tennis racket in place against the positioning bar for oscillation of the tennis racket as a pendulum about the shaft, a positioning plate movable between an operative position in contact with the butt end of the handle for locating the butt end a predetermined distance from the pendulum shaft and a retracted position out of contact with the butt end for permitting the racket to oscillate about the shaft as a pendulum, and an output device for providing an electrical signal indicative of the period of oscillation of the tennis racket about the shaft, and a storage medium for storing an executable program responsive to commands from an operator for determining from the electrical signals from the balance and the output device (a) the weight of the tennis racket using the electrical signal from the balance when the tennis racket is supported by the balance, (b) the distance from the butt end to the mass centroid of the tennis racket using the weight and the electrical signal from the balance when the tennis racket is placed on the forward and rear racket supports and the reference member is moved to its retracted position, and (c) a moment of inertia of the tennis racket using the weight, the distance from the butt end to the mass centroid and the electrical signal from the output device.

In accordance with another aspect of the invention, a method for customizing a new sports implement uses a digital computer having stored therein the weight of a reference sports implement and the location of the mass centroid of the reference sports implement as defined by the distance from a part of the reference sports implement to the mass centroid thereof, wherein the method comprises the steps of inputting to the digital computer from an electronic balance a first electrical signal representing the total weight of the new sports implement, inputting to the digital computer from an electronic balance a second electrical signal representing the weight on the balance when the new sports implement is supported by a first implement support on the balance and a second implement support disposed a predetermined distance from the first implement support and from the part of the new sports implement, calculating from the second electrical signal, the predetermined distances and the total weight the location of the mass centroid of the new sports implement as defined by the distance from the part of the new sports implement to the mass centroid thereof, comparing the total weight and mass centroid location of the new sports implement with the total weight and mass centroid location of the reference sports implement, and determining whether there is one or more locations where weight can be added to the new sports implement to provide the same total weight and mass centroid location as the reference sports implement.

In accordance with that same aspect of the invention, such method may also use a digital computer having stored therein a moment of inertia of the reference sports implement, in which case the method further comprises the steps of inputting to the digital computer a third electrical signal representing a period of oscillation of the new sports implement suspended as a pendulum about an axis a known distance from the part of the new sports implement, calculating from the third electrical signal, the known distance and the total weight a moment of inertia of the new sports implement, comparing the total weight, mass centroid location and moment of inertia of the new sports implement with the total weight, mass centroid location and moment of inertia of the reference sports implement, and determining whether there is one or more locations where weight can be added to the new sports implement to provide the same total weight, mass centroid location and moment of inertia as the reference sports implement.

In one embodiment of the method described above, the sports implement is a tennis racket. The invention also contemplates checking a completed new sports implement such as a tennis racket by following the above-identified method aspects of the invention to obtain the completed implement's total weight, mass centroid location and, if desired, moment of inertia, and comparing them with the reference sports implement's total weight, mass centroid location and moment of inertia.

In yet another aspect of the invention, the method uses a measuring unit including an electronic balance, the first implement support, the second implement support and a reference member disposed a fixed distance from the second implement support for locating the part of the sports implement, and the method further comprises the step of calibrating the measuring unit by providing a calibrating member having a known weight and mass centroid location a s defined by the distance from a part of the calibrating member to the mass centroid thereof, placing the calibrating member on the first and second implement supports with the part of the calibrating member being located using the reference member, inputting to the digital computer from the balance the second electrical signal, and calculating from the second electrical signal and the known weight and mass centroid location of the calibrating member the distance between the first and second implement supports.

BRIEF DESCRIPTION OF THE DRAWINGS

The objects of the invention will be better understood from the detailed description of its preferred embodiments which follows below, when taken in conjunction with the accompanying drawings, in which like numerals refer to like features throughout. The following is a brief identification of the drawing figures used in the accompanying detailed description.

FIG. 9 depicts a fifth embodiment of a holding member for a pendulum bracket in accordance with the present invention, wherein

FIG. 12 depicts an eighth embodiment of a holding member for a pendulum bracket in accordance with the present invention, wherein

DETAILED DESCRIPTION OF PREFERRED EMBODIMENTS

Figure 1:
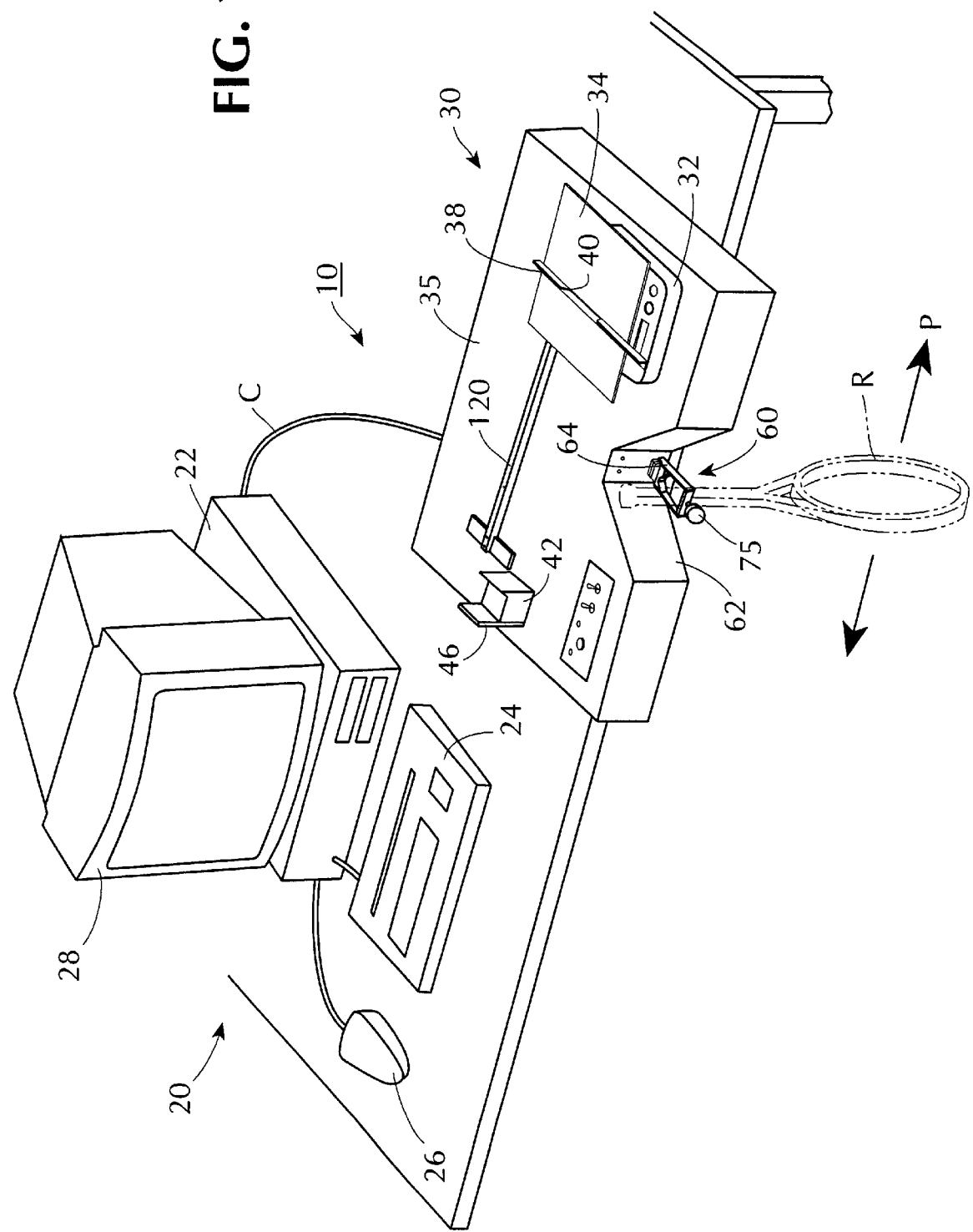
FIG. 1 is a perspective view of an apparatus for measuring and changing physical properties of a tennis racket in accordance with a preferred embodiment of the present invention.

FIG. 1 shows an apparatus 10 capable of measuring the weight, center of gravity and moment of inertia of an object, particularly a tennis racket R, the sports implement for which the apparatus in FIG. 1 is especially adapted. The apparatus 10 includes a conventional computer 20, with a conventional central processing unit (CPU) 22 programmed in accordance with the present invention as discussed in more detail below. The computer 20 also includes a conventional keyboard 24 and a mouse 26 for inputting information and commands to the CPU 22, as well as a conventional monitor 28 as an output device.

The CPU 22 is connected via cable C to a measuring unit 30. The measuring unit 30 includes an electronic balance 32 that is mounted on a baseplate 33 (see FIG. 3) of the measuring unit and protrudes through a top cover 35 of the measuring unit. A balance plate assembly 34 on the weighing platform (not shown) of the balance 32 includes a rigid flat plate 36 with a forward racket support 38 made of an angle iron secured to the flat plate 36. The forward racket support 38 can be attached to the flat plate 36 in any suitable manner, such as machine screws that pass through one of the flanges of the angle iron comprising the racket support and then thread into the flat plate. The forward racket support has a cutout portion 40, where the upright flange of the angle iron is removed, for a purpose described in detail below.

To hold the flat plate 36 in place on the scale's weighing platform (not shown), a number of chamfered blocks can be attached to the bottom of the flat plate 36 to form a rectangle that has the same dimensions as the rectangular weighing platform. For example, four chamfered blocks can be attached to the bottom of the plate 36 so that they fit snugly against the edges of the weighing platform when the plate is placed on top of the platform. This manner of mounting the balance plate assembly to the weighing platform is advantageous because it permits removal of the balance plate assembly and thus allows different balance plate assemblies to be used for different racket sizes and permits the balance to be used without the balance plate assembly.

Figure 4:
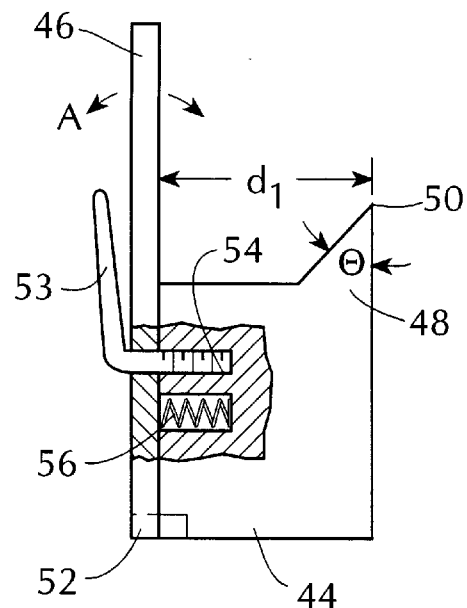
FIG. 4 is a detailed side view of the racket locating bracket of the apparatus shown in FIG. 1.

A rear racket support 42 is secured to the baseplate 33 of the measuring unit 30 and protrudes through the top cover 35 at a predetermined distance from the balance 32. The rear racket support includes a support block 44 to which is hinged a racket-balance locating plate 46. As best seen in FIG. 4, the rear racket support block 44 includes a raised portion 48, which can conveniently be provided by making the support block of an easily milled material such as aluminum, and then removing some of it by cutting to form the raised portion 48. The raised portion 48 extends upwardly at an angle θ, typically 45°. It is important that the raised portion 48 end in a sharp edge 50, for a purpose that will be described below.

The racket-balance locating plate 46 is attached to the block 44 by a hinge 52 that permits the locating plate to rotate relative to the block in the direction of the arrow A. A locking lever 53 is journaled in an opening in the locating plate 46 in a manner that prevents movement of the locking lever 53 along its axis at the portion where it passes through the locating plate. The locking lever 53 is threaded at one end so that it can be screwed into a threaded blind hole 54 in the block 44. A spring 56 in another blind hole in the block 44 moves the locating plate away from the block along the arc A when the locking lever is screwed out of the threaded hole in the block. That is, the locating plate 46 has an operative position shown in FIG. 4, and a retracted position in which it swings to the left (in FIG. 4) about the hinge 52 upon release of the locking lever 53.

Those skilled in the art will appreciate that the rear racket support can take forms other than the particular embodiment described and depicted herein. For example, the locating plate could be operated by a cam-and-lever arrangement in which a cam would hold the plate into an operative position against the force of a spring such as the spring 56. Or a motorized system could be used in which a small electric motor turns a worm gear to drive the locating plate between its operative and retracted positions. In such a system, the motor could be operated by a manually operated switch or under the control of the software described below.

The base plate 33 can be made of any suitable material, plastic being a preferred one for ease of manufacture and low cost. The balance 32 can be rigidly secured to the base plate or held in place by locating blocks 59 held in place on the base plate by screws. The support block 44 is typically secured to the base plate by screws that pass through the base plate and thread into holes in the support block. Leveling feet (not shown) can also be provided on the base plate to increase the accuracy of the measurements made in accordance with the present invention as described below. If desired, a leveling device (such as a bubble in a sight glass) can be provided on the cover 35.

The measuring unit 30 also includes a pendulum bracket 60 at the front of the measuring unit. The pendulum bracket 60 is shown in more detail in FIGS. 2 and 5. The pendulum bracket 60 is disposed in a notch 62 (omitted from FIG. 3)

in the front of the measuring unit 30 so as to keep the overall dimensions of the measuring unit to a minimum. That is, by placing the bracket 60 in a notch, it does not protrude an undue amount from the measurement unit, which also serves to protect the unit from impact by passersby.

The pendulum bracket 60 comprises a holding member 64 that is mounted on a shaft 66. The holding member 64 comprises two parallel side bars 68 that are secured together at their distal ends by an end bar 70. The side bars 68 are secured together at their proximal ends by a racket positioning bar 72, which is secured to the shaft 66. The side bars, end bar and racket positioning bar can be secured together by screws or manufactured in other ways, such as being made as an integral unit by machining the pendulum bracket from a solid block of a suitable material like aluminum. The pendulum bracket 60 is symmetrical about an axis 73 that coincides with the axis of the shaft 66. A stop bar 74 is secured to the measuring unit 30 in the notch 62. The stop bar cooperates with the racket positioning bar 72 to limit the extent of rotation of the pendulum bracket 60 about the shaft 66, for a purpose discussed in more detail below.

The pendulum bracket 60 also includes a thumb screw 75 extending through a threaded opening in the end bar 70. The thumb screw 75 is also coaxial with the axis 73 and the shaft 66. One end of the thumb screw 75 has a knob 76 with a knurled surface to aid gripping by the user. The other end has a bearing pad 78 on it. The bearing pad is mounted to the thumb screw by a ball-and-socket joint to enable the bearing plate to assume different angular orientations relative to the thumb screw shaft.

Figure 5:
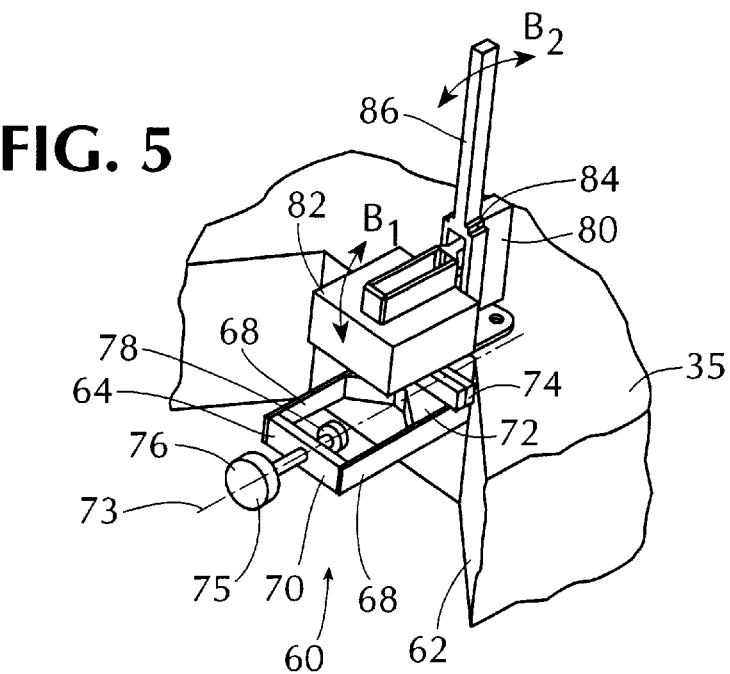
FIG. 5 is a detailed perspective view of the pendulum bracket of the apparatus shown in FIG. 1.
Figure 15:
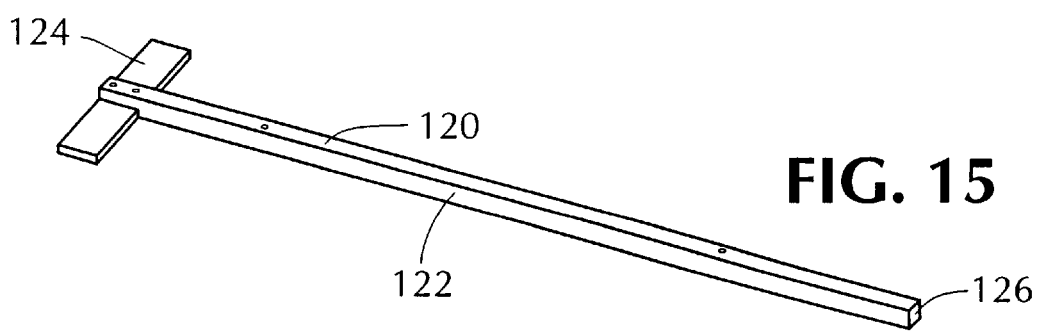
FIG. 15 is a detailed perspective view of a preferred embodiment of a calibration bar used to calibrate the apparatus shown in FIG. 1.

The pendulum bracket 60 further includes a racket positioning assembly 80 (omitted from FIG. 1 for clarity) on the top cover 35. The racket positioning assembly includes a positioning plate 82 mounted to a spring-loaded camming mechanism 84 with an operating handle 86. The camming mechanism 84 moves the positioning plate 82 in an arc $B_1$ when the handle 86 is moved in an arc $B_2$. The positioning plate 82 is shown in FIG. 5 in its operative position with the positioning plate held by a spring at a predetermined location against a stop. When the handle is pulled backward from its vertical position shown, the camming mechanism pulls the positioning plate upward against the force of the spring into an over-center retracted position where it is held by the spring until the handle is again moved forwardly.

FIGS. 6 through 14 depict alternate embodiments of the holding member 64 depicted in FIG. 5.

Figure 6:
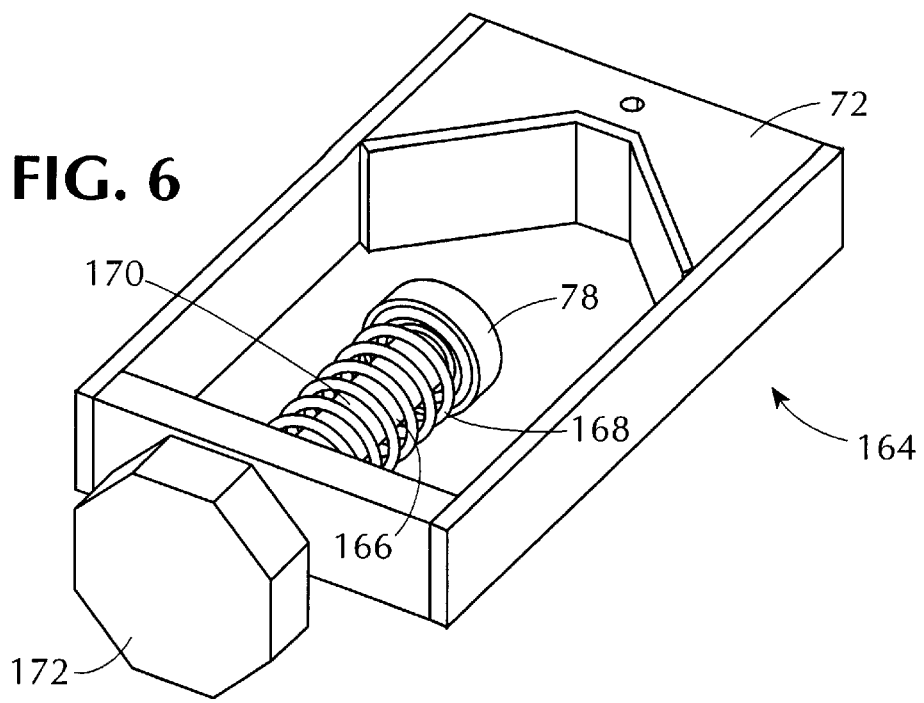
FIG. 6 is a perspective view of a second embodiment of a holding member for a pendulum bracket in accordance with the present invention.

FIG. 6 shows a holding member 164 in which the thumb screw 75 is replaced by a plunger 166 that is urged toward the racket positioning bar 72 by a compression spring 168. The plunger 166 includes a shaft 170 that slides in an opening through the end bar. A knob 172 allows the user to pull the plunger 166 axially outwardly and insert the racket between the bearing pad 78 and the notch in the racket positioning bar 72, so that when the knob 172 is released the racket is held in place by the force exerted by the spring 168.

Figure 7:
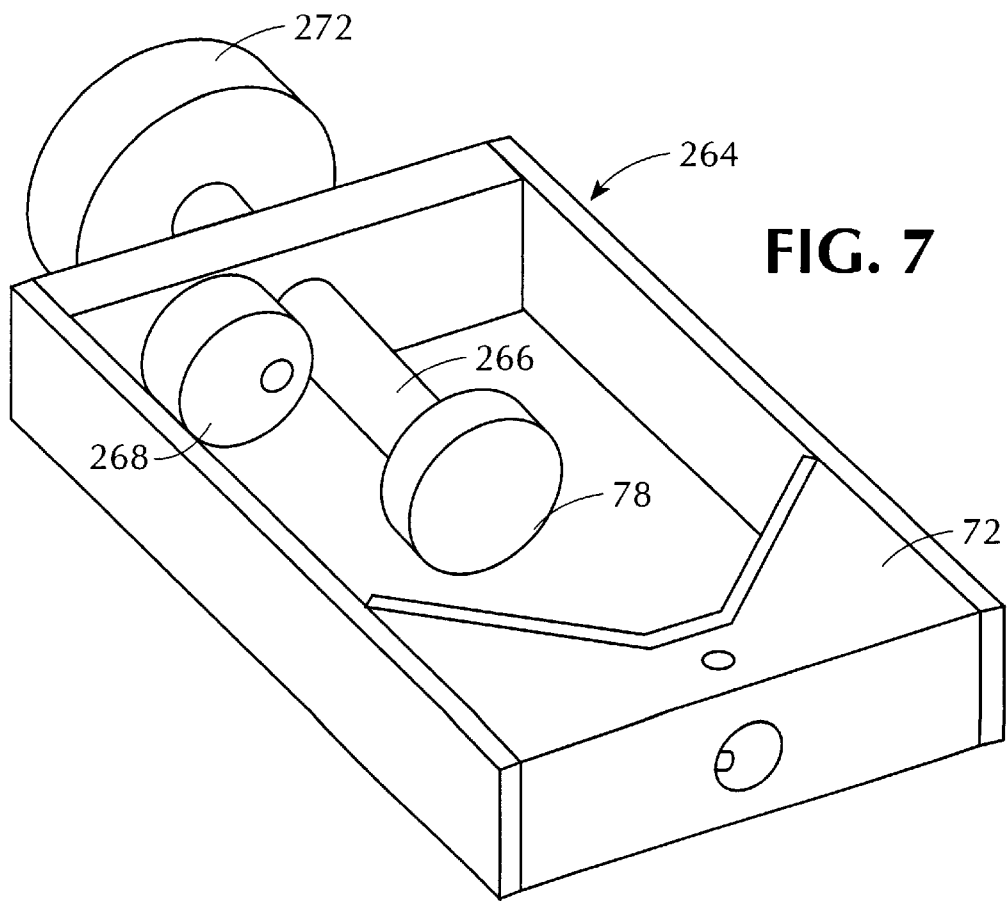
FIG. 7 is a perspective view of a third embodiment of a holding member for a pendulum bracket in accordance with the present invention.

FIG. 7 shows a holding member 264 in which a plunger 266 can slide along its axis to clamp to racket in place between the positioning bar 72 and the bearing pad 78. A cam 268 is in frictional engagement with the shaft of the plunger 266. Accordingly, after the plunger is moved to the desired position to clamp the racket in place, the operator turns the plunger knob 272 to rotate the plunger shaft. The cam is rotated by its frictional engagement with the plunger shaft and fixes the plunger shaft axially by wedging it in place.

Figure 8:
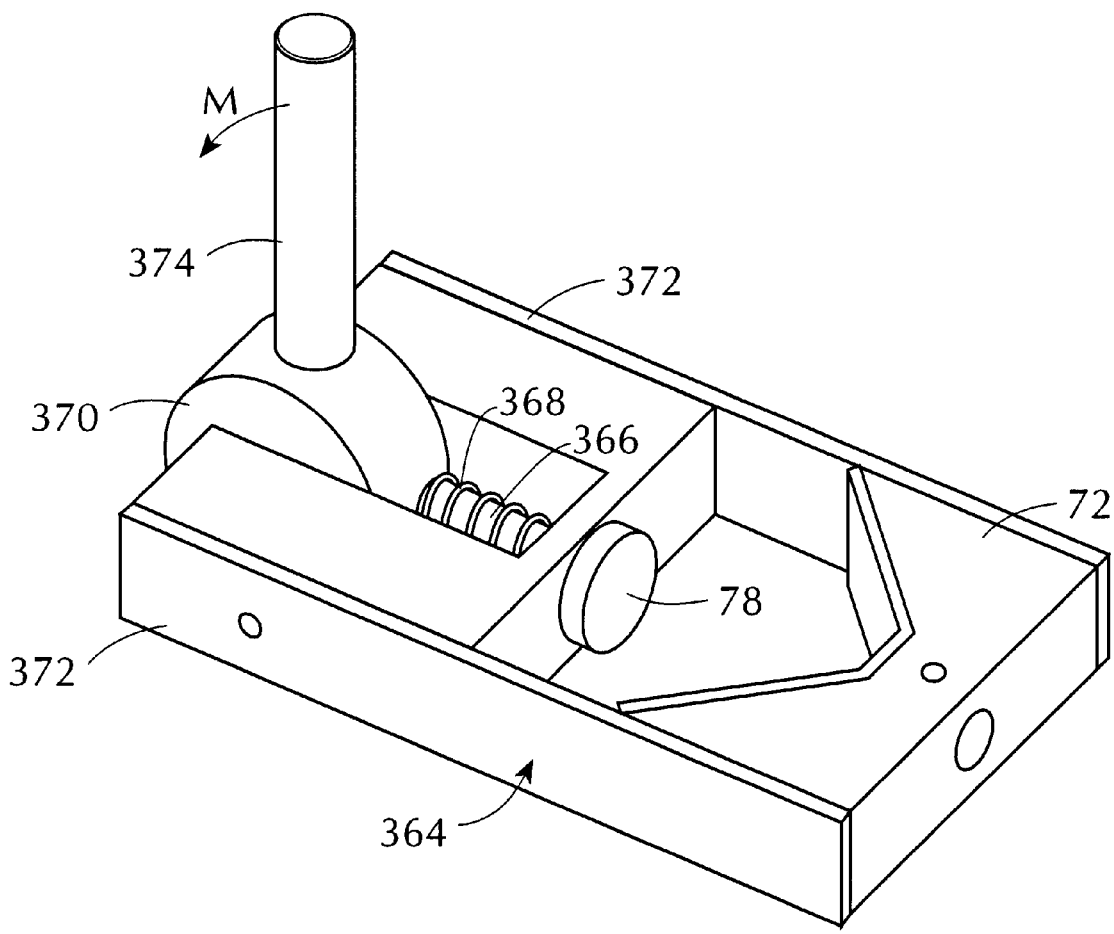
FIG. 8 is a perspective view of a fourth embodiment of a holding member for a pendulum bracket in accordance with the present invention.

FIG. 8 shows a holding member 364 using a plunger 366 that is biased by a spring 368. A cam 370 is mounted for rotation between side bars 372, and the spring biases the plunger into contact with the cam. A handle 374 is attached to the cam 370 to rotate it. When the handle 374 is pulled downward in the direction of arrow M, the bearing pad 78 is urged toward the positioning bar 72 to clamp the racket in place.

Figure 9A:
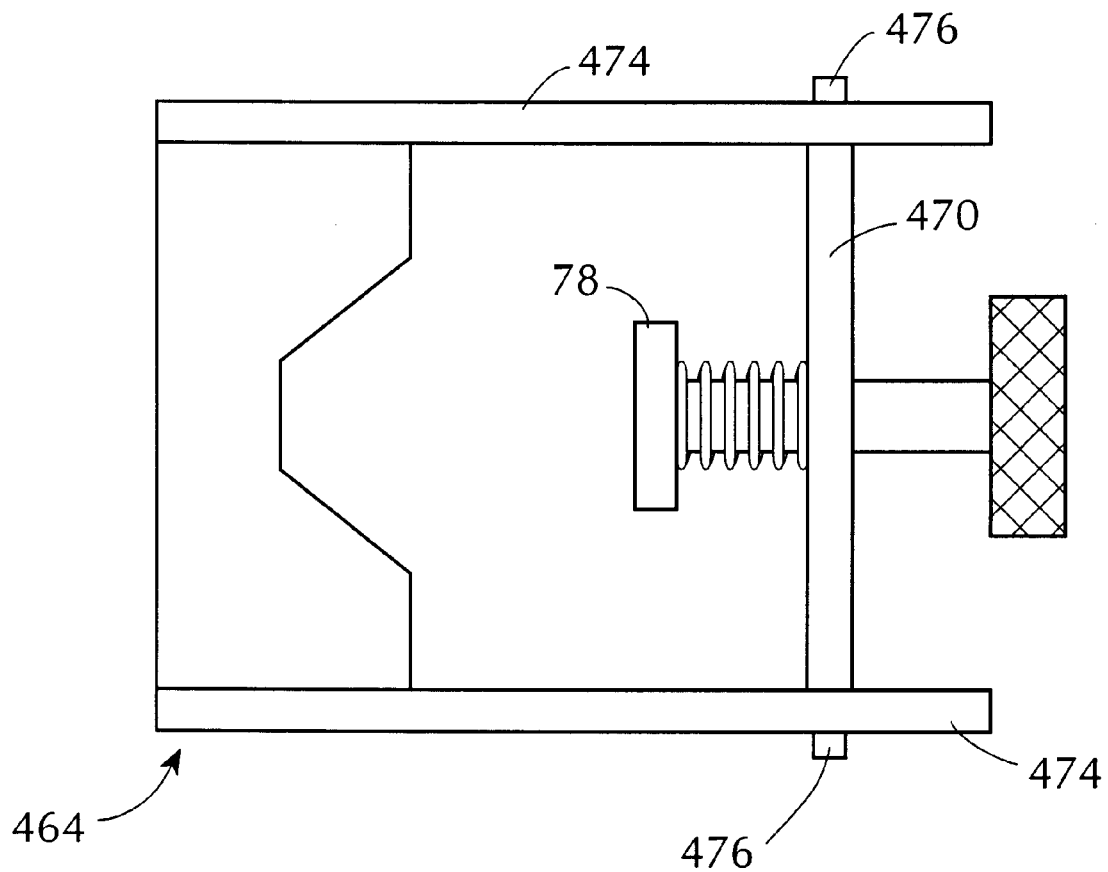
FIG. 9A is a top view of the holding member and FIG. 9B is a side view of the holding member.
Figure 9B:
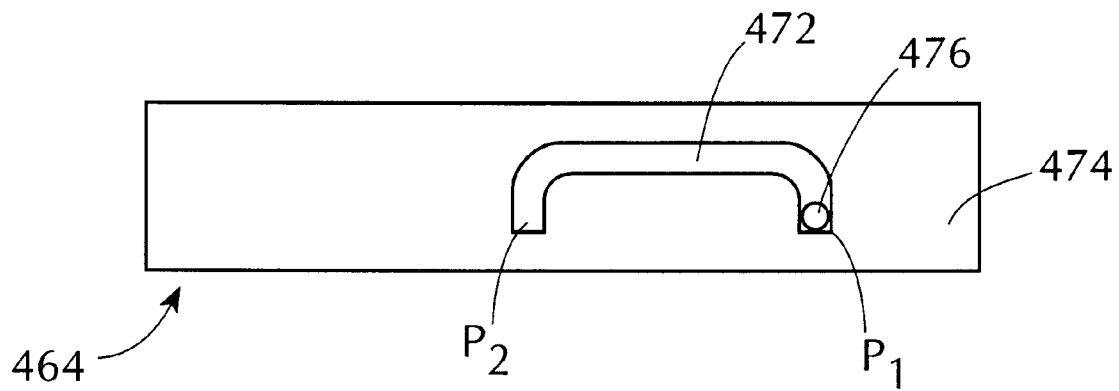

FIGS. 9A and 9B are top and side views of a holding member 464 that incorporates a spring-loaded plunger 166 like that shown in FIG. 6. However, in this embodiment the end bar 470 is mounted at its ends in slots 472 in the respective side bars 474. The slots are an inverted U-shape and accept pins 476 on the end bar that slide in the slots to provide two end-bar positions where a racket can be held in place. The first position $P_1$ (where the pins are located in the drawings) is used to clamp a racket with a completed handle. The second position $P_2$ is used to clamp a raw racket (a racket blank). The slots can be configured, such as with slight detents, to provide positive engagement of the pins in each position.

Figure 10:
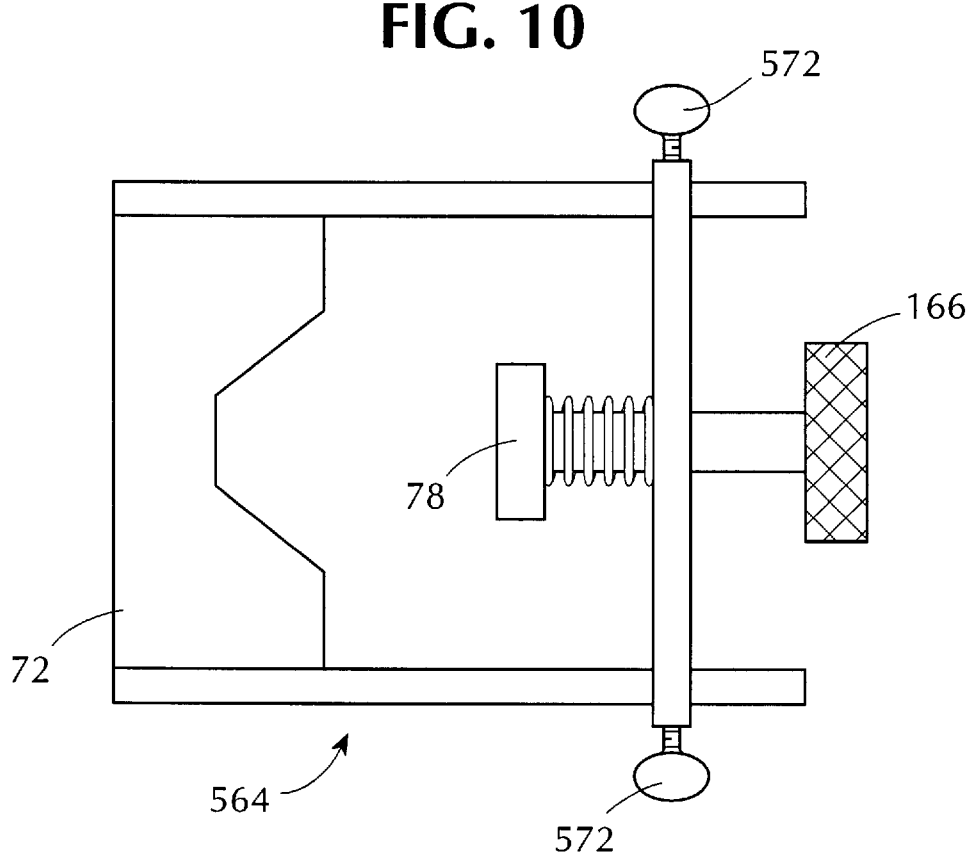
FIG. 10 is a top view of a sixth embodiment of a holding member for a pendulum bracket in accordance with the present invention.

FIG. 10 depicts a holding member 564 that is similar to that just described, but it has an end bar 570 that can be adjustably positioned on the side bars with thumb screws 572, rather than providing only two discrete positions by using the slots 472. The spring-loaded plunger can thus be positioned to provide an optimum holding force.

Figure 11:
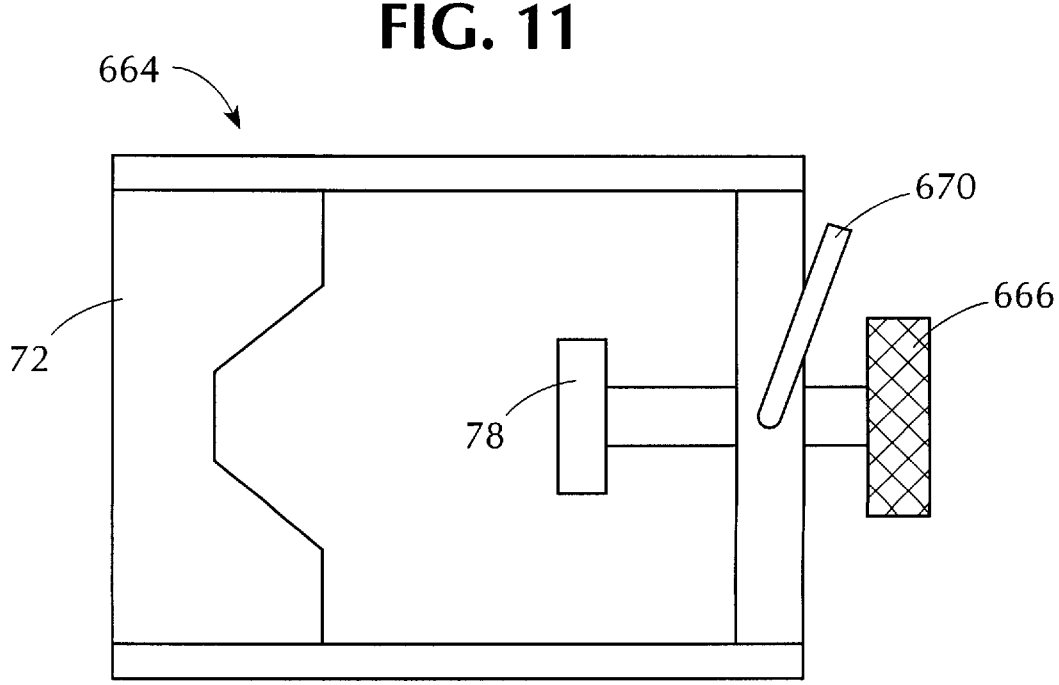
FIG. 11 is a top view of a seventh embodiment of a holding member for a pendulum bracket in accordance with the present invention.

FIG. 11 depicts a holding member 664 which has a plunger 666 similar to the one used in the embodiment depicted in FIG. 6. Although it is not shown, the plunger may be spring-biased in a fashion similar to that shown in FIG. 6. The difference is that the embodiment depicted in FIG. 11 has a locking lever 670 in a threaded hole in the end bar. The locking lever serves as a set screw to hold the plunger in place to secure the racket in the holding member. That is, the locking lever 670 can be backed out of engagement with the plunger 666 to enable the plunger to be urged against the racket. The locking lever can than be turned so that its end engages the surface of the plunger to hold the plunger securely in place.

Figure 12A:
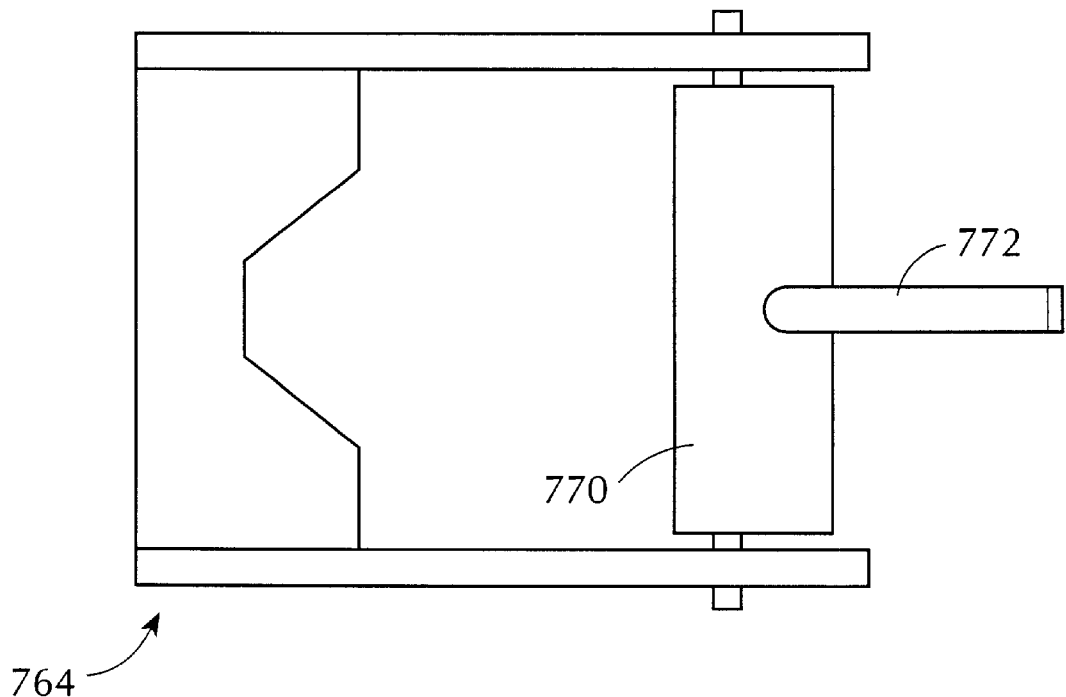
FIG. 12A is a top view of the holding member and FIG. 12B is a side view of the holding member.
Figure 12B:
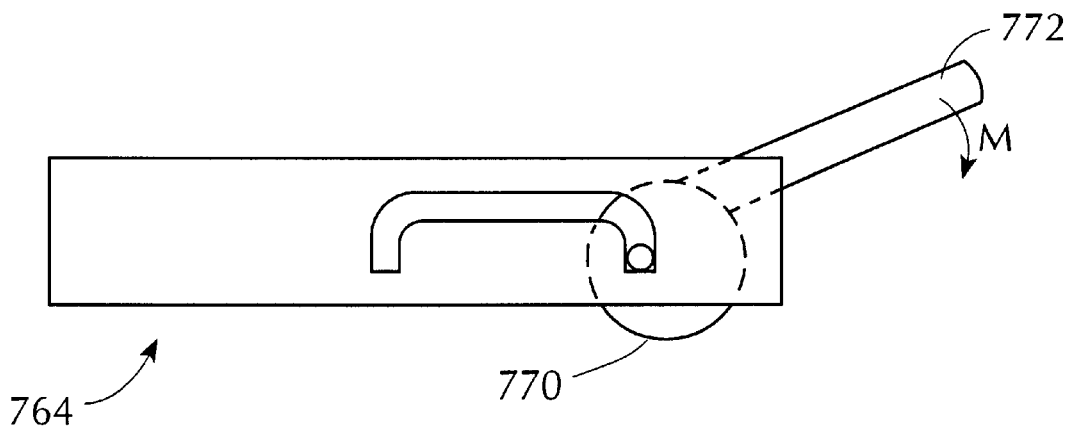

FIG. 12 depicts a holding member 764 with inverted U-shaped slots in its side bars in a fashion similar to those in the embodiment depicted in FIG. 9. However, instead of using a plunger to secure the racket in place, the holding member 764 has a cam 770 with a lever 772 extending generally radially from the cam. When the cam mounting pins 774 are in the appropriate ends of the corresponding slots, the lever 772 is pulled downward in the direction of arrow M. In that fashion, the cam surface captures the racket between itself and the positioning block, locking the racket in place.

Figure 13:
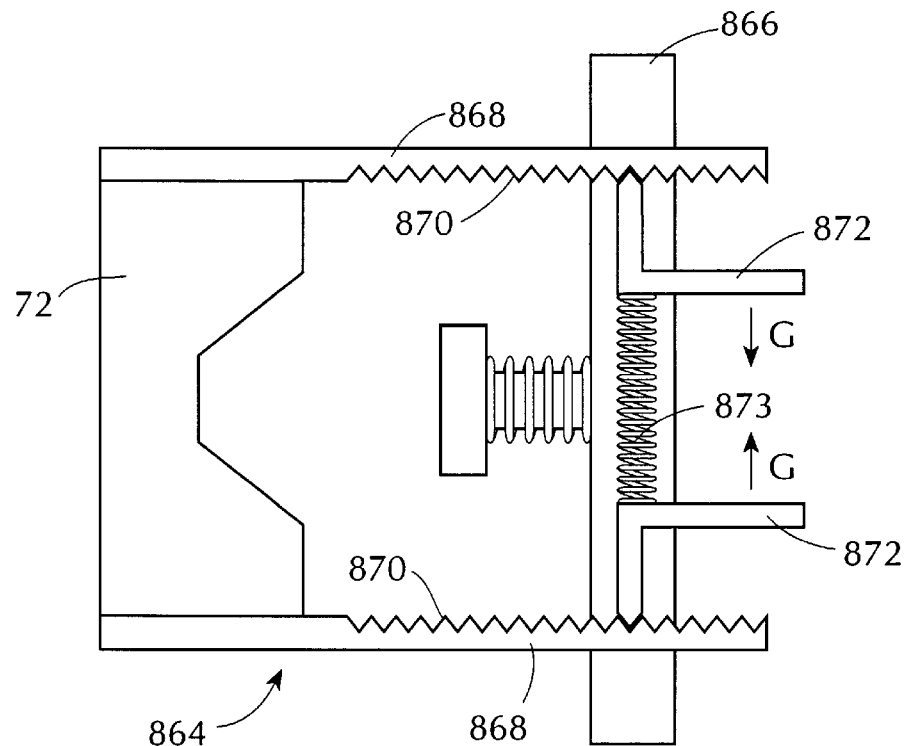
FIG. 13 is a top view of a ninth embodiment of a holding member for a pendulum bracket in accordance with the present invention.

FIG. 13 depicts a holding member 864 in which an end bar 866 can be moved to a desired position relative to the side bars 868. To that end, the side bars 868 have ratchet teeth 870 on their inner surfaces. The end bar has gripper members 872 slidably mounted to the end bar in a suitable fashion. The gripper members 872 are L-shaped, with an end of one leg of the L engaging the teeth 870 on a corresponding side bar, with the ends of the other leg of the L forming a handle.

To operate the holding member 864 the user grasps the handle ends of the gripper members 872 between a thumb and forefinger to squeeze the gripper members together in the direction of the arrows G against the action of a spring 873 urging the gripper members into engagement with the ratchet teeth, thus releasing the hold of the members in the ratchet teeth. The user than slides the end bar so that the spring-loaded plunger 874 engages the racket to securely hold it against the positioning bar 72.

Figure 14:
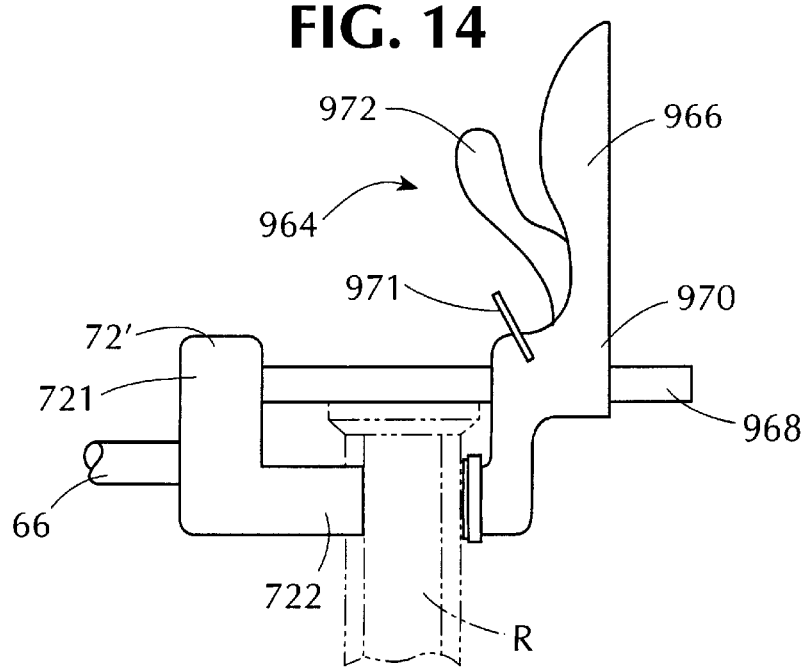
FIG. 14 is a side view of a tenth embodiment of a holding member for a pendulum bracket in accordance with the present invention.

FIG. 14 depicts a holding member 964 with quick-release type grip 966 slidably mounted on a shaft 968. The grip 966 includes a body portion 970 that is journaled on to the shaft 968 to enable it to move axially along the shaft. A handle member 972 is mounted to the body portion 970 for rotation relative to the body portion. When the handle member 972 is in the position shown, it grips the shaft 968 between a portion of the handle member and the body by the action of an internal spring that urges the handle into the gripping position. The handle member 972 is constructed so that repeated squeezing by the user moves the body portion 970 unidirectionally toward the positioning bar 72' to grip the handle of the racket R (shown in phantom lines in FIG. 14). A trigger release 971 is provided to enable the user to release the grip on the shaft 968, thus allowing the user to slide the body portion 970 along the shaft 968 in either direction.

The positioning bar 72' to which the shaft 968 is firmly secured is slightly altered from the configuration in the previous embodiments. A body portion 721 of the positioning bar 72' is secured to the shaft 66 and an integral positioning block portion 722 has a racket-accepting V-shaped cutout like that in positioning bar 72. A gripper portion 973 of the body holds the racket R in place in the V-shaped cutout.

Quick-release type grips are known to those skilled in the art, and the modifications necessary for use in the present invention will be clear from this description.

Figure 2:
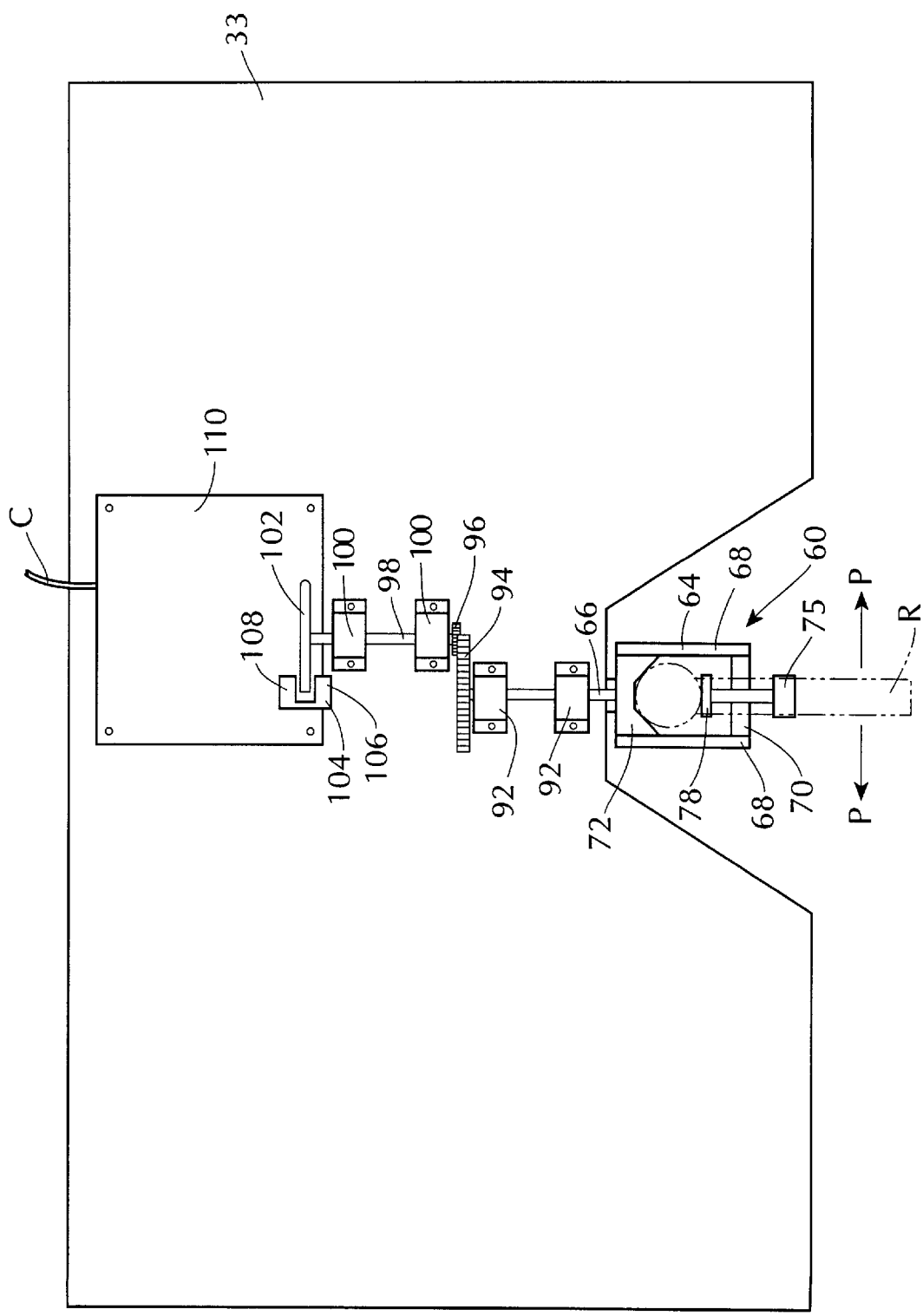
FIG. 2 is a plan view of the measuring unit of the apparatus shown in FIG. 1, with the cover removed to show its interior.

Referring to FIG. 2, the swing weight measuring mechanism that is disposed interiorly of the measuring unit 30 is shown in more detail. (Note that in the interest of clarity FIG. 2 does not depict the balance 32 and rear support 42, and FIG. 3 does not depict the swing weight measuring mechanism.) The shaft 66 that carries the pendulum bracket 60 is mounted for precision rotation in ball bearings in a pair of mounting brackets 92 secured to the base plate 33 of the measuring unit 30. The distal end of the shaft 66 has a gear 94 secured to it. The gear 94 meshes with another gear 96 that is mounted to the proximal end of a shaft 98 mounted for precision rotation in ball bearings in a pair of mounting brackets 100. A coding disc 102 is mounted to the distal end of the shaft 98. The coding disc 102 has a precisely located slot near its periphery. A sensor 104 comprising a light source, such as a light-emitting diode 106, directs light through the slot toward a photosensor 108. In a manner well known to those skilled in the art, the output of the photosensor thus provides an electrical signal indicative of the period of oscillation of the disc 102.

The measuring unit 30 contains circuitry comprising a variety of electronic and logic components that are not depicted in detail in these drawings because those skilled in the art will be readily able to provide them. For example, the balance 32 can be a commercial available Ohaus Model CT 1200 electronic balance. Such a balance is accurate to within 0.1 grams. The circuitry associated with the swing weight mechanism is typically included on a circuit board 110. The circuit board includes a clock generator running at 1.8432 MHz (±1.67 Hz). The disc 102 is about 1.5 in. in diameter and the measuring slot typically is 0.762 mm wide. The gears 94 and 96 have a gear ratio of 4:1 and a maximum backlash of 0.076 mm. The 4:1 gear ratio amplifies the angular motion of the shaft 98 (and thus the disc 102) relative to that of the shaft 66 (and thus the racket R), thereby increasing the accuracy of the measurement of the racket's oscillation period. Accordingly, the photosensor output measures the period of oscillation of the disc with an accuracy of ±104.1 microseconds. The weight that is output by the balance and the period that is output by the circuit board are provided via cable C as input to the CPU 22 of the computer 20. The signal selected for input to the CPU 22 is controlled by the software therein, as described below.

An RS232 output circuit provides data in serial form at a given bit rate, say 9600 baud, to the serial input of the CPU 22. This arrangement simplifies the connection of the measuring unit 30 to the CPU 22, since only one cable connection to the CPU 22 need be made. The circuitry in the measuring unit will also include a switch controlled by software in the CPU 22 in a manner described in more detail below, to determine which data is input to the CPU 22.

It will be clear to those skilled in the art that this arrangement enables the present system to be used with a CPU having a single serial port, like most laptop or desktop PCs. On the other hand, it will be equally clear that any suitable manner of communicating the signals representing weight (from the balance) and time (from the photosensor) to calculating circuitry can be employed within the scope of the present invention.

Those skilled in the art will appreciate that other variations on the basic structure described above and depicted in the drawings are possible without departing from the present invention.

As one example, the measuring unit 30 described above is made for use on a table top or other work surface, and it can be provided with suitable clamps or other devices for securing the measuring unit to a table top.

In the present embodiment the pendulum bracket is mounted on the same unit as the balance and the other components. In some applications it may be more convenient to have the pendulum bracket as a separate assembly. In that case, the pendulum bracket (with the associated positioning assembly mounted to it to form a single unit) can be table-top mounted or wall mounted. In the table-top version the entire pendulum bracket can be made to swivel horizontally and lock into position at any angle.

Figure 3:
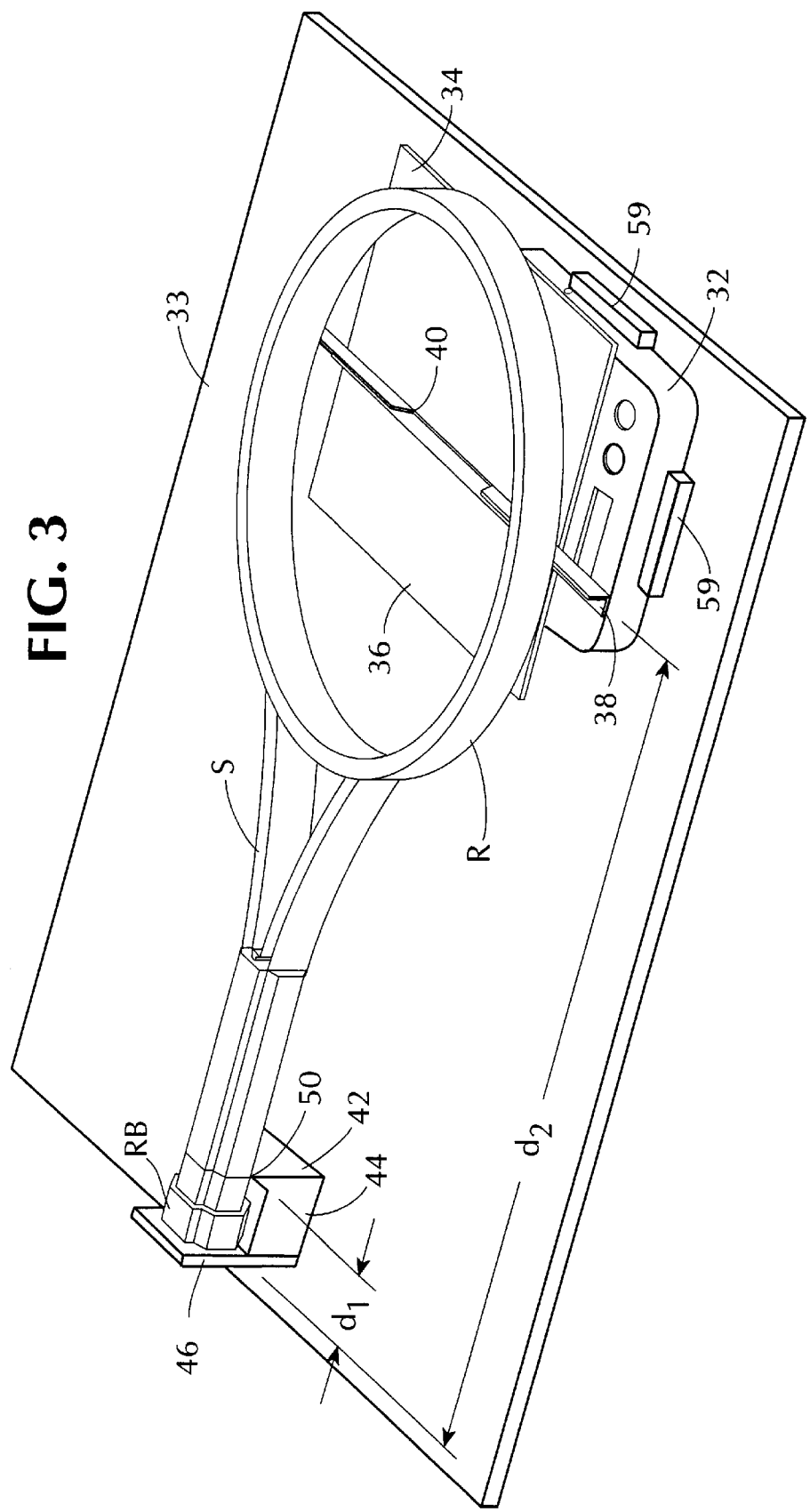
FIG. 3 is a perspective view of part of the apparatus shown in FIG. 1 with a tennis racket in place in preparation for measuring its center of gravity.

The measurement unit 30 is used as follows. Referring to FIG. 3, the measuring unit is depicted with a racket R in place to initiate determination of its balance. Balance is determined based on well known principles of physics. As noted above, "balance" or "balance point" is simply another term known to a scientist or engineer as center of gravity or, more precisely, the racket's mass centroid. The system according to the invention only determines the location of the racket's center of gravity in the longitudinal direction. This reflects various considerations. First, tennis rackets, particularly those of the highest quality, are generally symmetrical about their longitudinal axis, so that the racket's mass centroid will lie on that axis. Second, to the extent that the center of gravity may be spaced from that axis, the distance will be minuscule. Third, a tennis racket is used by swinging it in a plane generally including the longitudinal axis, so that variations in the center of gravity along that axis are more readily apparent to a player than a possible minor deviation of the center of gravity in the directions normal to that axis (namely, in the width and thickness directions of the racket).

In any event, the center of gravity is determined by measuring the force exerted by gravity at a first predetermined location on the racket while it is supported at a second predetermined location a known distance from the first location. In the system of the present invention, the racket R is placed on the measuring unit with its butt end RB against the racket-balance locating plate 46 as shown in FIG. 3. The racket is supported proximate to its butt end RB on the edge 50 of the raised portion 48 of the support block 44. In accordance with the invention, the distance $d_1$ from the face of the locating plate 46 to the edge 50 of the support block is precisely known. In addition, the distance $d_2$ between the face of the locating plate 46 and the edge of the forward racket support angle iron 38 is also precisely known. The sharp edge of the angle iron 38 and the sharp edge 50 of the support block provide precise support points that contribute to the accuracy achieved by the present invention.

In accordance with well known principles, the distance $d_{cg}$ from the butt end of the racket of the mass centroid is then given by the equation:

$$d_{cg}=[d_1 \cdot (W_o-W_{in})+d_2 \cdot W_{in}]/W_o \tag{1}$$

where $W_o$, is the total measured weight of the racket and $W_{in}$ is the weight input to the CPU 22 from the balance 32 with the racket in the position shown in FIG. 3 and after the locating plate 46 has been moved to its retracted position. This calculation is done by the CPU 22 in accordance with the discussion below.

From equation (1) it can be seen that it is necessary to know the racket's total weight $W_o$ to enable calculation of its center of gravity. Accordingly, the racket's total weight is measured by placing the racket R on the balance and storing the output in the CPU. The notch 40 in the racket support 38 facilitates this measurement because the notch is sized to allow the racket shank S to fit in the notch so that the racket will rest securely on the balance plate assembly 34 during the weighing operation. Otherwise, the balance plate assembly would have to be removed from the balance to weigh the racket to obtain $W_o$, and then the balance would have to be calibrated to account for the weight of the balance plate assembly to obtain $W_{in}$.

The racket's swing weight (moment of inertia) is also obtained using known principles of physics. That is, it is known that the moment of inertia can be calculated by determining the period of oscillation of an object of known weight about a pivot located a known distance from the object's center of gravity when the object is caused to oscillate as a pendulum in the earth's gravitational field. One of the features of the present invention is to suspend the racket from a pivot so that it becomes a pendulum. If it is then displaced from vertical, the earth's gravity will provide an oscillation producing force that is known to a high degree of accuracy. As noted above, known prior systems for measuring swing weight used springs, with the drawbacks already discussed. Moreover, prior art pendulum systems have been used to determine center of percussion (or "sweet spot"), not swing weight.

In the system of the present invention, swing weight is measured by clamping the racket in the pendulum bracket 60 with the butt end of the racket against the positioning plate 82 of the racket positioning assembly 80 when it is in its operative position as shown in FIG. 5. This is done by screwing the thumb screw 75 away from the positioning bar 72 and inserting the racket R from the bottom of the bracket 60 until the butt end of the handle abuts against the plate 82. The thumb screw is then tightened until the racket is firmly held in the bracket 60. As the thumb screw is tightened, the racket is forced into the proper location, with its longitudinal axis intersecting the axis of the shaft 66, by the notch in the positioning bar. The ball-and-socket joint holding the bearing pad onto the thumb screw ensures that the racket is held securely in the pendulum bracket. It should be noted that the racket is also placed in the bracket with the plane of the racket head H in the same plane as the shaft 66 (that is, normal to the direction of oscillation) because this orientation provides an axis of rotation in the same plane as normal tennis play. At this time, the positioning plate 82 is moved to its retracted position by operating the handle 86, and the racket is free to swing about the shaft 66. With this arrangement, the distance $d_3$ from the racket butt end RB to the axis of the shaft 66 is precisely known because the pendulum bracket is constructed with a known distance from the bottom surface of the positioning plate 82 to that axis.

The racket is then drawn by the operator to one side until the racket positioning bar 72 rests against the stop 74, which in the present embodiment provides an angular deflection of the racket of about 15°. The operator then releases the racket and it swings in the direction of the arrows P about shaft 66 at a period that is measured by the photosensor 108 and then output to the CPU 22. Under these circumstances, the moment of inertia $I_p$ about the axis of the shaft 66 can be expressed by the following equation:

$$I_p=[t^2 \cdot W_o \cdot g \cdot (d_{cg}-d_3)]/(2 \cdot K \cdot \pi)^2 \tag{2}$$

where t is the calculated period of oscillation, defined as $(t_1+t_2+t_3)/3$ (the first measured period $t_0$ being ignored to minimize errors introduced by differences in the manner in which different operators might release the racket ), g is the acceleration of gravity, and K is a constant that takes into account the relatively large angle of oscillation (30° peak-to-peak) and is 1.0043. As noted above, $d_3$ is the distance from the racket butt end to the axis of rotation 73.

Once the moment of inertia about any axis is known (here, the axis 66), the moment of inertia about an axis through the center of gravity ($I_{cg}$) can then be found using the following equation:

$$I_{cg}=I_p-W_o \cdot (d_{cg}-d_3)^2 \tag{3}$$

The parameter $I_{cg}$ is used in the present invention as described below (see, for example, equations (5) and (11a)).

It will be appreciated that in all of the above equations, the distance $d_2$ from the locating plate 46 to the edge of the angle iron that constitutes the forward racket support 38 must be known precisely, since it is one of the parameters on which all of the calculated quantities depend. To that end, a calibration bar 120 is used to calibrate the system. The calibration bar is T-shaped with a leg 122 having a cross-bar 124 attached at one end of the leg 122. The calibration bar 120 has a precisely known weight and a center of gravity at a precisely known distance from the rear face 126 of the leg 122.

To calibrate the system, that is, to determine the distance $d_2$, the balance plate assembly 34 is placed on the balance as shown above. As discussed, the balance plate assembly includes locating structure on its underside that determines with some precision where the scale plate assembly system is disposed on the scale. However, changes in environmental conditions such as temperature and humidity can affect the actual distance $d_2$ from one measurement to the next, particularly from day to day. Therefore, to ensure the accuracy that is a feature of the present invention, the system must be calibrated from time to time (typically at the beginning of use each day) using the calibration bar 120.

This is done by setting up the system as discussed above, with the balance plate assembly 34 in place on the balance 32. The locating plate 46 is in its operative position as shown in FIG. 3 and the calibration bar 120 is placed on the racket supports 38 and 50 with the rear face 126 of the leg 122 against the locating plate 46. The cross bar 124 is wide enough to span the notch 60 so that it rests on the angle iron 38. The locating plate is then moved to its retracted position and the reading $W_{in}$ from the scale is input to the CPU 22.

That reading is used to determine $d_2$ in accordance with the following equation:

$$d_2 = d_1 + (d_{cg} - d_1) \cdot (W_o / W_{in}) \quad (4)$$

It will be appreciated that all of the quantities on the right side of equation (4) are known. That is, $W_o$ here would be the known weight of the calibration bar 120, $d_{cg}$ is the known distance from the face 126 to the mass centroid of the calibration bar, and $W_{in}$ is the reading provided by the balance 32. Accordingly, the distance $d_2$ can be calculated and stored by the CPU 22 for the calculations required by equations (1) to (3). If desired, $W_o$ for the calibration bar 120 can be measured by placing it on the scale plate assembly and storing the output of the scale 32 before performing the calibration operation just discussed.

The present invention uses the computer 20 and the measuring unit 32 to determine the amount and location where weight must be added to a racket blank, sometimes referred to as a "raw" racket, (that is, a tennis racket without a butt cap, strings, handle or overwrap) to provide a desired weight, balance and swing weight. The sweet spot ("center of percussion") can also be determined with the present invention, although for top players that is of less significance than the other properties mentioned, since it is those properties that give the racket its characteristic "feel."

Customizing a racket in accordance with a preferred embodiment of the present invention first requires establishing a data base for a racket to be duplicated. Part of that effort involves taking measurements of a known racket. While it would theoretically be possible to customize a racket to any specification, one of the significant advantages of the invention is that it permits matching a new racket's properties with those of an existing "reference" racket with known properties. Accordingly, customizing a racket typically involves determining the properties of an existing racket.

Usually, a player brings a particular favorite racket he or she likes to a racket customizer and requests that it be duplicated. With the present invention, the weight, balance and swing weight of that racket can be determined in accordance with the discussion above and stored in a database in the CPU 22. Database programs that will store racket properties by some player identifier (typically the player's name) and racket identifier (such as manufacturer and model designation) are well known and need not be described in detail here. Such programs enable the desired racket properties to be accessed by address codes that correspond to a player's name and the racket identification data. The racket may also have a serial number that is stored to enable data regarding that particular racket to be retrieved.

To exemplify the present invention, assume that Player A has previously identified a particular finished Racket 1 by Manufacturer X as a favorite that the player would like duplicated.

A particularly advantageous embodiment of a system for carrying out the present invention in accordance with the present invention uses a program that operates under Microsoft's Windows 95® operating software on a programmable digital computer. In that manner, a graphical user interface with which most people are familiar gives a user visual prompts that he can follow by using the keyboard 24 and mouse 26 as input devices. Another embodiment of the invention could use a program embodied in firmware in a custom chip set and a built-in viewing screen, which would thus not require programming a computer. It should be understood that the term "digital computer" or "calculation circuit" as used herein encompasses both a programmable digital computer and firmware, as well as other ways of executing algorithms according to the invention.

It is contemplated that a user will be supplied a measuring unit (with an integral or separate pendulum unit) and calibration bar as described above. Software for practicing the invention can be supplied on a storage medium, such as a floppy disc magnetically imprinted with the program or a CD-ROM disc with the program on it, that is loaded into the user's own digital computer. If the invention is to be performed with firmware embodying a custom chip set comprising the storage medium with the program on it, along with requisite input devices, then the hardware (measuring unit and calibration bar) and firmware are supplied together.

In any event, an exemplary program for carrying out the present invention will first prompt the user to select from a menu that includes options such as CHECK FINISHED RACKET, CUSTOMIZE RACKET and ACCESS DATABASE. To explain one embodiment of the present invention, assume that a new Racket 1 has been customized as described further below. The present invention permits that new racket to be checked against values prestored in a database for the reference Racket 1, to confirm that the new Racket 1 has the same properties as the reference Racket 1.

To that end, CHECK FINISHED RACKET is chosen from the displayed menu, and the CPU 22 opens a dialog box that asks the user to input with the keyboard 24 a player identification (such as name) and appropriate racket identifiers (such as manufacturer and model designation). It then prompts the user to place the finished new racket on the balance and, once he has done so, the mouse is used to click on a box marked "Read Weight" or other appropriate notation. The software then inputs the weight $W_{n1}$ of the newly customized Racket 1 into the CPU 22 as described above. The weight may also be displayed on the monitor as visual confirmation that it has been measured.

When the weighing operation is completed, the software prompts the user to measure $W_{in}$ for the racket. For example, a prompt will appear on the monitor 28 instructing the user to determine balance. The user will then place the new Racket 1 in position to measure $W_{in}$. After moving the locating plate 46 to its retracted position, the user will click with the mouse on another box marked "Get Balance Point." The software will then store $W_{in}$ and, using $W_{n1}$ as $W_o$, calculate the distance $d_{cgn1}$ for the new Racket 1 in accordance with equation (1) above. Again, $d_{cgn1}$ may also be displayed.

Next, the software asks if the user wants to determine the swing weight of the new Racket 1. If the user so selects, the monitor displays an appropriate message, and the user clamps the new Racket 1 into the pendulum bracket 60 as described above and then moves the positioning plate 82 to its retracted position. The user then clicks on a box marked "Get Pendulum Data." The software detects that the racket is swinging about the shaft 66 (by detecting an output from the photosensor 108), and calculates t in equation (2) above, as explained there. The program then calculates $I_{pn1}$ in accordance with equation (2), and then $I_{cgn1}$ in accordance with equation (3).

The swing weight (moment of inertia) about the center of the player's grip, $I_{gn1}$ is calculated as follows:

$$I_{gn1} = I_{cgn1} + W_{n1} \cdot (d_{cgn1} - d_{gn1})^2 \quad (5)$$

where $d_{gn1}$ is the distance from the butt end of the new Racket 1 to the center of the grip on the new Racket 1.

The swing weight about an axis through the player's grip is used because that is where the player holds the racket during play. Accordingly, duplicating $I_{gn1}$ in a customized racket is the most direct way to duplicate in the newly customized racket how the reference Racket 1 feels to Player A. The center of the player's grip is determined by having the player hold the racket as he or she would during play, and is deemed to be located where the player's index and third fingers meet the player's palm.

The user then clicks on a box marked "Continue" or other suitable notation to display an screen that summarizes the results of the above discussed CHECK FINISHED RACKET procedure. This screen displays the measured values of weight; balance point and swing weight for the new Racket 1 and the specified values of those parameters for the reference Racket 1 stored in the database referred to above. It is within the scope of the present invention not to compare the new Racket 1 to a specified reference racket, in which case only the values for the new Racket 1 are displayed.

The customizing procedure in the present example uses values describing the reference Racket 1 stored in the database. If Player A requests that Racket 1 be duplicated, the customizer first opens the software program referred to above. CUSTOMIZE RACKET is chosen from the menu that appears, and the procedure (in this example) begins with a "raw" racket, that is, one without a butt cap, molded handle, grip, overwrap, strings or weights. This is the form in which a raw racket is normally supplied by the manufacturer. It is within the scope of the present invention to begin with other than a raw racket. For example, the present invention can be used to customize a raw racket with a handle already molded in place. The invention can even be used with a completely finished racket to indicate if weights can be added, and if so, where to add them, to have the racket meet a certain specification or match the properties of another finished racket. Those skilled in the art will appreciate how to modify the procedure to be described to customize such rackets.

The software itself can monitor the calibration operations that have taken place and prompt the user accordingly. For example, the software might prompt a calibration operation each time the program is opened, or after a certain lapse of time since the last calibration. Another approach would use a detector to determine if the balance plate assembly 34 has been removed and prevent further operation until a calibration operation has been performed.

If a calibration operation is to be performed, the user is prompted to do so. At that time, the calibration bar 122 is placed on the measuring unit as discussed above and the CPU 22 calculates and stores $d_2$ in accordance with equation (4). The calibration bar 122 is then stored in a permanent location on the measuring unit by suitable clips, thumb screws, or other securing device.

The menu referred to above then appears on the screen of the monitor and the user selects CUSTOMIZE RACKET. The screen then changes to permit selection of a player and racket manufacturer, model and serial number. The screen then changes again to permit selection of the start condition (that is, the condition of the racket blank to be customized) and the end condition (the final condition of the customized racket). For purposes of illustration, it will be assumed that the start condition for this example is RAW and the end condition is UNSTRUNG WITH GRIP. (It will be appreciated that the procedure can be modified to customize a racket to different end conditions.)

After the user clicks on a box with a suitable notation such as Continue or Done, the screen displays a suitable graphic indicating that racket weight is to be determined. After the raw racket is placed on the balance as noted above, its weight $W_o$ is transmitted to the CPU 22 and stored. The software may include a display of the weight as visual confirmation that it has been measured properly.

The program then prompts the user to determine the distance $d_{cg}$, which locates the center of gravity of the raw racket from its butt end, using equation (1) above. The procedure for determining $d_{cg}$ is explained above. Once $d_{cg}$ is calculated, a preferred embodiment of the invention presents the user with an option of customizing the racket to match the reference Racket 1's weight and balance only, or also to match the reference Racket 1's swing weight. If the program is to be used to attempt to match swing weight, the raw racket's moment of inertia about its center of gravity $I_{cg}$ is determined as explained above (see equation (5)).

In any case, once the user makes the appropriate choice, the program calculates the size and placement of weights to be added to the raw racket in order that its final weight, balance, and (if chosen) swing weight about an axis through the center of the player's grip, after completion is the same as those of the reference Racket 1. In the present example, the racket was to be customized to its unstrung condition, so the final condition must match that of the reference Racket 1 in its unstrung condition.

All of the parameters stored in the database relating to the reference Racket 1 that contribute to weight, balance and swing weight are then used to calculate the molded handle weight of the new Racket 1 and the location and weight of lead tape to be added to the raw racket to match the weight, balance and swing weight of the reference Racket 1. The equations and conditions described in the Appendix are used in those calculations.

In a preferred embodiment of the present invention the program will determine if a lead tape location that will produce the desired result requires placement of the tape in a location where the player does not want to have the tape. That is, players often have personal preferences that exclude the location of lead tape at certain places on the racket. For example, they might find it distracting to be able to see tape at certain locations. In any case, the present invention determines if a particular calculated location for a piece of lead tape is in an exclusion zone and determines if there are alternate locations that will produce the same result.

The calculation approach used by a preferred program in accordance with the present invention assumes a lead tape location and then calculates the desired parameters using the assumed locations. The invention uses an iterative procedure whereby selected locations of lead tape weights are used in the calculations until all conditions (that is, specified weight, balance point and moment of inertia) are satisfied. This is explained more fully in the Appendix. Those skilled in the art will appreciate that other approaches can be used within the scope of the invention.

Another aspect of the present invention enables the racket customizer to know whether or not a finished racket can be made to the desired specifications before expending effort to actually complete the finished racket. It will be appreciated that there is a possibility that no molded handle weight and no placement of lead weights will yield a finished racket with the desired weight, balance and swing weight. If that is the case, the program can include a step whereby the user is informed that the desired specification cannot be met with the particular raw racket being used. It is also possible to have the program determine if lead weights can be placed appropriately to provide just the desired weight and balance, thus foregoing meeting the desired swing weight.

The latter option is particularly useful because many players do not require a particular swing weight. In fact, as noted above the program can be written to enable the customizing operation to proceed by bypassing the swing weight measurement and calculations either automatically for certain players or by providing the option of skipping the swing weight measurement after completing the location of the raw racket's balance point.

Once the location and weight of the lead tape and the molded handle weight are determined and it is determined whether any additional weight in the racket handle is required, the user completes the new racket using the raw racket. That is, the proper handle compound is prepared and a finished handle with the contours appropriate to a particular player is molded around the handle portion of the raw racket in accordance with known practice. That is, tennis racket handle molds come in standard shapes, and an appropriate shape for a particular player can be stored in the database created in accordance with the invention. Optionally, a handle mold can be custom made for a player, for example, from an existing racket.

In any event, tennis racket handles are typically molded in situ around the handle portion of the raw racket. Known handle-molding compounds will expand to fill the handle mold, up to a certain amount, which amount determines the minimum obtainable handle weight. That is, less than that amount of molding compound will not expand to fill the mold. (Those skilled in the art are familiar with such expandable compounds, any of which may be used to practice the present invention.) Therefore, the manner in which a handle of the desired weight, as determined by the present invention, is molded is to weigh the required amount of molding compound in a container and then pour it into the handle mold.

If necessary, the program according to the present invention indicates that additional lead weight should be added to the handle in case the required handle weight is greater than the maximum obtainable molded handle weight or a molded handle is already in place (that is, the starting condition is not "raw"). The program can calculate where the extra tape should be added. (See points 1 and 2 in the Appendix.) However, if the weight is being molded into the handle, it is typically placed in the longitudinal center of the handle. If the weight is to be added to a finished racket with a handle, the added weight may be added by wrapping lead tape around the handle at its distal end and then covering the lead tape with an overwrap.

A butt cap and overwrap in accordance with the racket specification are also added. Lead tape of the proper length and type (as determined by the invention) is also added to the racket blank. Note that the invention calculates the total weight and location (in terms of the distance from the butt end of the racket butt cap) where lead tape should be added. The user actually divides by two the total weight indicated by the program as being required, and places the two equal weights at identical locations along the racket's longitudinal axis. The program can be tailored to take into account the length of the lead tape and the effect that length has on the racket properties due to its location on the racket.

If the finished racket is to be strung, a stringing operation is performed to the player's specifications. However, it is more common that a player will request that the racket be provided unstrung, since most top players change stringing characteristics depending on playing conditions.

After the racket is thus completed, the present invention enables verification that it has the desired weight, balance point and swing weight. This verification is performed by selecting the entry CHECK FINISHED RACKET from the main menu as described above.

If at the time the program is begun ACCESS DATABASE is chosen from the menu, the CPU 22 opens a dialog box that asks the user to input with the keyboard 24 a player identification (such as name) and appropriate racket identifiers (such as manufacturer, model number and serial number). The user then follows a standard database entry procedure for a Windows 95® program to enter the following quantities that describe the reference racket (the symbols used for each parameter are by way of example only):

a. The weight of the strings ($W_s$)

b. The weight of the butt cap ($W_{bc}$)

c. The weight of the grip ($W_{gr}$)

d. The weight of the overwrap ($W_{ow}$), if any e. The mandatory weight ($W_{mw}$), if any (some players specify locations where weight is to be added)

f. The maximum obtainable weight of the handle ($W_{amax}$), and the minimum obtainable weight of the handle ($W_{amin}$)

g. The weight of a reference handle ($W_{aref}$) (this is the weight of a nominal handle of nominal dimensions, used as a "starting point" for the handle properties to simplify calculations)

h. The total length of the racket from the butt end of the butt cap to the distal end of the racket, including the bumper ($d_{spec}$)

i. The distance from the butt end of the butt cap to the center of the player's grip ($d_g$)

j. The distance from the butt end of the butt cap to the center of gravity of the string area ($d_s$)

k. The distance from the butt end of the butt cap to the butt cap center of gravity ($d_{bc}$)

l. The distance from the butt end of the butt cap to the grip center of gravity ($d_{gr}$)

m. The distance from the butt end of the butt cap to the overwrap center of gravity ($d_{ow}$)

n. The distance from the butt end of the butt cap to the center of gravity of the mandatory weight, if any ($d_{mw}$)

o. The distance from the butt end of the butt cap to the center of gravity of the handle ($d_{mh}$)

p. The thickness of the butt cap ($t_{bc}$)

q. The thickness of the frame at the head end including the bumper ($t_{fr}$)

r. The distance from the butt end of the butt cap to the proximal end of the i'th exclusion zone ($d_{pi}$, being an integer from 1 to 5, indicating that a player can specify up to five exclusion zones)

s. The distance from the butt end of the butt cap to the distal end of the i'th exclusion zone ($d_{di}$)

t. The moment of inertia of the butt cap about the butt cap center of gravity ($I_{bco}$)

u. The moment of inertia of the grip about the center of gravity of the grip ($I_{gro}$)

v. The moment of inertia of the overwrap about the center of gravity of the overwrap ($I_{owo}$)

w. The measured semi-major axis of the string area (A)

x. Moment of inertia of the reference handle (see g above) about the reference handle center of gravity ($I_{mhoref}$)

y. The distance from the butt end of the handle to the center of gravity of the handle ($d_{rbh}$)

z. The distance from the butt end of the butt cap to the center of gravity of the added lead weight in the handle, if any ($d_{xh}$).

It should be noted that many of the above quantities are approximations based on the fact that certain components have very similar geometries and weights, even if they vary slightly from piece to piece. For example, the distances in items k to m and the moments of inertia in items t to v are approximations based on the fact that butt caps, grips and overwraps all have basically the same geometry. While those components affect the final result, variations from one such component to the other are minor. Those minor variations have a negligible effect on the moment of inertia of the finished racket about the center of the player's grip because the components are close to that point.

The weight ($W_1$), distance from the butt end of the butt cap to the center of gravity ($d_{cg1}$), and the moment of inertia about the center of the player's grip ($I_{g1}$), for the reference Racket 1 are also stored in the database. Those values may be determined using the same procedure described above for measuring those values when performing the CHECK FINISHED RACKET procedure.

As noted above, the software can also be programmed to determine the "sweet spot" (center of percussion) of the racket relative to the player's grip. Those skilled in the art know that the center of percussion of an object is the same as the equivalent length l of the object suspended as a pendulum. According to known principles, $l = g \cdot (t \cdot 2 \cdot \pi)^2$, where t is the period of the pendulum. Therefore, the distance from the center of the player's grip to the sweet spot of the reference Racket 1 can be calculated because the period of oscillation of the racket suspended as a pendulum at axis 73 is known. As a result, the principles disclosed herein can be used to determine the weight distribution required in the racket being customized to provide the same distance from the center of the player's grip to the sweet spot.

The present invention has been described in the context of an embodiment in which a racket is customized by adding weights as described above. It should be appreciated that the invention encompasses simply measuring a racket to determine its physical properties, such as weight, balance point, swing weight and sweet spot, without necessarily calculating where weights should be added to match reference values for those parameters. For example, the invention could include software that presents a menu option that simply measures the desired values for an existing racket. Upon choosing that menu option, the software would then prompt the user to follow steps like those outlined above until the desired properties of the racket are determined and then displayed and/or printed out.

The present invention has been described herein in connection with specific embodiments, but those skilled in the art will appreciate that modifications other than those specifically pointed out herein can be made without departing from the spirit of the invention. Accordingly, the scope of the invention is defined solely by the claims below.

APPENDIX

1. Determination of the required weight of the molded handle ($W_a$) and lead tape weight ($W_b$) when customizing a aw racket:

$$W_a = (d_t \cdot K_{wt} - K_{bal})/(d_t - d_{mh}) \quad (6)$$

$$W_b = (K_{bal} - d_{mh} \cdot K_{wt})/(d_t - d_{mh}) \quad (7)$$

The symbols used in equations (6) and (7) have the following meanings:

$$K_{wt} = W_1 - W_o - W_s - W_{bc} - W_{gr} - W_{ow} - W_{mw}$$

$$K_{bal} = d_{cg1} \cdot W_1 - (d_{cg} + t_{bc}) \cdot W_o - d_s \cdot W_s - d_{bc} \cdot W_{bc} - d_{gr} \cdot W_{gr} - d_{ow} \cdot W_{ow} - d_{mw} \cdot W_{mw}$$

and $d_t$ is the distance from the butt end of the butt cap to the center of the added lead tape.

The approach followed by the program is to choose an initial value of $d_t$ and calculate $W_a$ and $W_b$ using equations (5) and (6). A typical starting $d_t$ is $d_t = d_{d1}$ (see item s above). In an especially preferred embodiment, the software "positions" the proximal end of the lead tape at the distal end of the exclusion zone. If $W_{amax} \geq W_a \geq W_{amin}$ and $W_b > 0$, then the program stops. Otherwise, further values of $d_t$ are tried until those conditions (and equation (10)) are satisfied or it is established that there is no value of $d_t$ that will satisfy them.

2. Determination of the extra weight required in the molded handle ($W_{xh}$) and the lead tape weight ($W_b$) when customizing other than a raw racket, or when customizing a raw racket and the only value of $d_t$ that meets equation (10) and results in $W_b > 0$ also results in $W_a > W_{amax}$:

$$W_{xh} = [d_t \cdot (K_{wt} - W_{amax}) - (K_{bal} - d_{mh} \cdot W_{amax})]/(d_t - d_{xh}) \quad (8)$$

$$W_b = [(K_{bal} - d_{mh} \cdot W_{amax}) - d_{xh} \cdot (K_{wt} - W_{amax})]/(d_t - d_{mh}) \quad (9)$$

(When the racket has a molded handle in place, $W_{amax}$ is set to 0 in equations (8) and (9)).

3. To determine if $d_t$ is in an exclusion zone, the following relationship is used for a particular $d_t$:

$$d_{pi} < d_t < d_{di} \quad (10)$$

4. Calculation of the moment of inertia (swing weight) of a finished racket about the center of the player's grip ($I_{g1c}$) when the starting condition is raw and no weight is to be added to the handle:

$$I_{g1c} = I_{gstgr} + I_{sg} + I_{mhg} + I_{bcg} + I_{grg} + I_{owg} + I_{mwg} + I_{tapg} \quad (11)$$

The symbols used in equation (11) have the following meanings:

$I_{gstgr}$ is the moment of inertia of the raw racket about the center of the player's grip calculated as follows:

$$I_{gstgr} = I_{cg} + W_o \cdot (d_{cg} + t_{bc} - d_g)^2 \quad (11a)$$

$I_{sg}$ is the moment of inertia of the strings about the center of the player's grip calculated as follows:

$$I_{sg} = W_s \cdot A^2/4 + W_s \cdot (d_{spec} - t_{fr} - A - d_g)^2]$$

$I_{mhg}$ is the moment of inertia of the handle about the center of the player's grip calculated as follows:

$$I_{mhg} = I_{mhoref} \cdot W_a/W_{aref} = W_a \cdot (d_g - t_{bc} - d_{rbh})^2$$

$I_{bcg}$ is the moment of inertia of the butt cap about the center of the player's grip calculated as follows:

$$I_{bcg} = I_{bco} + W_{bc} \cdot (d_g - d_{bc})^2$$

$I_{grg}$ is the moment of inertia of the grip about the center of the player's grip calculated as follows:

$$I_{grg} = I_{gro} + W_{gr} \cdot (d_g - d_{gr})^2$$

$I_{owg}$ is the moment of inertia of the overwrap about the center of the player's grip calculated as follows:

$$I_{owg} = I_{owo} + W_{ow} \cdot (d_g - d_{ow})^2$$

$I_{mwg}$ is the moment of inertia of the mandatory weight about the center of the player's grip calculated as follows:

$$I_{mwg}=W_{mw}\cdot(d_g-d_{mw})^2 \qquad (5)$$

$I_{tapg}$ is the moment of inertia of the added lead tape about the center of the player's grip calculated as follows:

$$I_{tapg}=W_b\cdot(d_g-d_{tapg})^2 \qquad (10)$$

where $d_{tapg}$ is the distance from the butt end of the butt cap to the center of gravity of the added lead tape.

5. Calculation of the moment of inertia of a finished racket about the center of player's grip when the starting condition is not raw, or it is raw but weight must be added to the handle, uses the same equations as in 4., except as follows:

$I_{mhg}$ is calculated as follows:

$$I_{mhg}=I_{mhoref}\cdot W_{amax}/W_{aref}+W_o\cdot(d_g-t_{bc}-d_{rbh})^2$$

$I_{xhg}$ is the moment of inertia of the extra weight added to the handle about the center of the player's grip and is calculated as follows:

$$I_{xhg}=W_{hx}\cdot(d_g-d_{xh})^2$$

With the above substitutions, $I_{g1c}$ is calculated as follows:

$$I_{g1c}=I_{gstgr}+I_{sg}+I_{mhg}+I_{bcg}+I_{grg}+I_{owg}+I_{mwg}+I_{tapg}+I_{xhg} \qquad (12)$$

6. Determination of swing weight error E:

$$E=I_{g1}-I_{g1c} \qquad (13)$$

where $I_{g1c}$ is calculated according to either equation (11) or (12).

7. Interpolation to locate center of lead tape $d_{t(i+1)}$ when the sign of the swing weight has changed between the last two trial values of $d_t$, that is, $d_{ti}$ and $d_{t(i-1)}$:

$$d_{t(i+1)}=d_{ti}-[E_i\cdot(d_{ti}-d_{t(i-1)})]/[E_i-E_{(i-1)}] \qquad (14)$$

What is claimed is:

1. A system for customizing a sports implement, the system comprising:
a measuring unit including an electronic balance for providing an electrical signal indicative of a weight exerted on the balance, a first implement support on said balance, a second implement support disposed a predetermined distance from said first implement support, and a reference member for locating a part of said sports implement at a predetermined position relative to said first and second implement supports; and
a calculation circuit for determining from said electrical signal the weight of said sports implement when said sports implement is supported by said balance and the distance from said part of said sports implement to the mass centroid thereof when said sports implement is supported by said first and second implement supports after said part of said sports implement is located at the predetermined position using said reference member.

2. A system as in claim 1, further comprising:
a pendulum unit for holding said sports implement for oscillation as a pendulum; and
an output device for providing to said calculation circuit an electrical signal indicative of the period of oscillation of said sports implement, wherein said calculation circuit calculates a moment of inertia of said sports implement using the period of oscillation of said sports implement, the weight of said sports implement and the distance from the part of said sports implement to the mass centroid thereof.

3. A system as in claim 2, wherein:
said pendulum unit includes a pendulum bracket mounted for rotation about an axis, said pendulum bracket having means for clamping said sports implement in place therein, and a positioning member for locating the part of said sports implement at a predetermined position relative to said axis; and
said output device detects rotation of said axis as said sports implement oscillates as a pendulum.

4. A system as in claim 3, wherein said measuring unit includes said pendulum unit and said output device.

5. A system as in claim 1 for customizing a tennis racket, further comprising a rear racket support including a mounting member including said first implement support and said reference member, wherein:
said first implement includes a sharp edge for supporting the handle of said tennis racket;
said reference member is mounted to said mounting member and includes a reference surface for contacting the butt end of the tennis racket when the tennis racket is supported by said first and second implement supports; and
said calculation circuit calculates the distance from the butt end of said tennis racket to the mass centroid thereof.

6. A system as in claim 5, wherein said reference member is mounted to said mounting member for movement out of contact with said butt end of said tennis racket after said tennis racket is placed on said first and second implement supports.

7. A system as in claim 6, wherein said reference member is hinged to said mounting member and is movable between an operative position wherein said reference surface is in a position for contacting said butt end of said racket and a retracted position wherein said reference surface is out of contact with said butt end of said tennis racket.

8. A system as in claim 5, further comprising a balance plate assembly removably mounted to said balance, said balance plate assembly including means for locating said balance plate assembly relative to said balance.

9. A system as in claim 8, wherein said first implement support includes a forward racket support mounted to said balance plate assembly and having a sharp edge for supporting a portion of said tennis racket remote from said handle thereof.

10. A system as in claim 5, further comprising:
a pendulum unit having a pendulum bracket mounted for rotation about a pendulum shaft, said pendulum bracket including a positioning bar and a clamping member for clamping said handle of said tennis racket in place against said positioning bar, and a positioning plate for contacting said butt end of said tennis racket to locate said butt end a predetermined distance from said pendulum shaft; and
an output device for providing to said calculation circuit an electrical signal indicative of the period of oscillation of said tennis racket about said axis, wherein said calculation circuit calculates a moment of inertia of said tennis racket from said period of oscillation of said tennis racket, said weight of said tennis racket and said distance from said butt end of said tennis racket to said mass centroid thereof.

11. A system as in claim 10, wherein said positioning plate is mounted for movement out of contact with said butt end of said tennis racket when said tennis racket is clamped in place by said positioning bar and said clamping member.

12. A system for customizing a sports implement according to claim 1, further comprising a calibrating member having a known weight and mass centroid location, wherein said calculation circuit determines the distance between said first and said second implement supports based upon said electrical signal, when said calibrating member is supported by said first and said second implement supports, said known weight, and the known mass centroid location of said calibrating member.

13. A system for customizing a sports implement, the system comprising:
  a pendulum unit for holding said sports implement for oscillation as a pendulum, said pendulum unit having a positioning member for receiving the butt end of said sports implement to establish a common axis of rotation regardless of the position at which said sports implement is gripped by a user;
  an output device for providing an electrical signal indicative of the period of oscillation of said sports implement; and
  a calculation circuit for determining from said electrical signal a moment of inertia of said sports implement about said common axis using the period of oscillation of said sports implement, the weight of said sports implement and the distance from said axis to the mass centroid of said sports implement.

14. A system as in claim 13, wherein:
  said pendulum unit includes a pendulum bracket mounted for rotation about a shaft, said pendulum bracket having means for clamping said sports implement in place therein, and a positioning member for locating a part of said sports implement at a predetermined position relative to said shaft; and
  said output device detects rotation of said shaft as said sports implement oscillates as a pendulum.

15. A system for customizing a tennis racket, the system comprising:
  a measuring unit including:
    an electronic balance mounted to said measuring unit for providing an electrical signal indicative of a weight placed on said balance,
    a forward racket support on said balance and having a sharp edge for supporting a portion of said tennis racket remote from the handle thereof,
    a rear racket support with a sharp edge disposed a predetermined distance from said forward racket support for supporting said handle of said tennis racket, and
    a reference member mounted for movement between an operative position in contact with the butt end of said handle for locating said butt end a predetermined distance from said front and rear racket supports and a retracted position out of contact with said butt end;
  a pendulum unit including:
    a pendulum bracket mounted for rotation about a pendulum shaft, said pendulum bracket including a positioning bar and a clamping member for clamping said handle of said tennis racket in place against said positioning bar for oscillation of said tennis racket as a pendulum about said shaft,
    a positioning plate movable between an operative position in contact with said butt end of said handle for locating said butt end a predetermined distance from said pendulum shaft and a retracted position out of contact with said butt end for permitting said racket to oscillate about said shaft as a pendulum, and
    an output device for providing an electrical signal indicative of the period of oscillation of said tennis racket about said shaft; and
  a storage medium for storing an executable program responsive to commands from an operation for determining from said electrical signals from said balance and said output device (a) the weight of said tennis racket using said electrical signal from said balance when said tennis racket is supported by said balance, (b) the distance from said butt end to the mass centroid of said tennis racket using said weight and said electrical signal from said balance when said tennis racket is placed on said forward and rear racket supports and said reference member is moved to its retracted position, and (c) a moment of inertia of said tennis racket using said weight, said distance from said butt end to said mass centroid and said electrical signal from said output device.

16. A system as in claim 15, wherein said sharp edge of said forward racket support has a central cutout for permitting said tennis racket to be stably supported on said balance.

17. A system as in claim 15, wherein said reference member is hinged to said rear racket support for movement between said operative position and said retracted position, and said rear racket support further includes securing means for securing said reference member in said operative position, wherein said securing means includes a handle for manually moving said reference member between said operative position and said retracted position.

18. A system as in claim 15, wherein:
  said pendulum unit includes a stop member for cooperating with said positioning bar to establish 15° as the magnitude of the initial displacement from vertical by said operator of said tennis racket held in place as a pendulum by said positioning bar and said clamping member; and
  said output device includes a disc having a slot therein secured to said shaft and a photosensor for detecting electromagnetic radiation directed through said slot as said tennis racket oscillates as a pendulum.

19. A system as in claim 18, wherein said pendulum unit further includes a positioning assembly for mounting said positioning plate to said measuring unit for movement between said operative position and said retracted position, wherein said positioning assembly includes overcenter camming means for holding said positioning plate selectively in said operative position and said retracted position and a handle for manually operating said overcenter camming means.

20. A system as in claim 15, wherein said positioning bar includes a notch centered on said shaft for receiving said handle and said clamping member includes a clamping pad for exerting a force axially of said shaft to urge said handle into said notch.

21. A system as in claim 20, wherein said clamping member includes a threaded shaft for moving said clamping pad toward and away from said positioning bar when said shaft is turned.

22. A system as in claim 20, wherein said clamping member includes a journaled shaft mounting said clamping pad and a compression spring around said journaled shaft biasing said clamping pad toward said positioning bar.

23. A system as in claim 20, wherein said pendulum bracket includes a rotatably journaled shaft for moving said clamping pad toward and away from said positioning bar and a locking cam frictionally engaging said shaft for holding said shaft in a desired position upon manual rotation thereof.

24. A system as in claim 20, wherein said pendulum bracket includes a journaled shaft, a compression spring around said journaled shaft biasing said clamping pad away from said positioning bar, and a manually operated moving cam for moving said shaft against said spring-bias to clamp said racket in place against said positioning bar.

25. A system as in claim 20, wherein said clamping member includes:
    side bars attached to opposing ends of said positioning bar;
    an end bar mounted to said side bars for movement toward and away from said positioning bar, wherein said end bar is mounted in inverted-U shaped slots in said side bars for selective manual placement in first and second positions different distances from said positioning bar;
    a shaft journaled in said end bar and mounting said clamping pad; and
    a compression spring around said journaled shaft biasing said clamping pad toward said positioning bar.

26. A system as in claim 20, wherein said clamping member includes:
    side bars attached to opposing ends of said positioning bar;
    an end bar slidably mounted to said side bars for movement toward and away from said positioning bar;
    thumb screws for manually securing said end bar in a desired location along said side bars;
    a shaft journaled in said end bar and mounting said clamping pad; and
    a compression spring around said journaled shaft biasing said clamping pad toward said positioning bar.

27. A system as in claim 20, wherein said pendulum bracket includes a journaled shaft for moving said clamping pad toward and away from said positioning bar and a manually operated, threaded locking lever for holding said shaft in a desired position.

28. A system as in claim 20, wherein said clamping member includes side bars attached to opposing ends of said positioning bar, an eccentric locking cam with cam mounting pins disposed in inverted-U shaped slots in said side bars for selective manual placement of said locking cam in first and second positions different distances from said positioning bar, said locking cam including a cam handle for rotating said locking cam about said cam mounting pins to clamp said racket handle between a peripheral surface of said locking cam and said positioning bar.

29. A system as in claim 20, wherein said clamping member includes side bars attached to opposing ends of said positioning bar, said side bars having ratchet teeth on facing surfaces thereof, an end bar mounted between said side bars for movement toward and away from said positioning bar and having said clamping pad mounted thereto, and L-shaped gripper members slidably mounted to said end bar for engagement with said ratchet teeth to hold said side bars in a desired position relative to said positioning bar, wherein corresponding ends of said gripper members form a handle for manually disengaging said gripper members from said ratchet teeth to enable movement of said end bar to a desired position.

30. A system as in claim 20, wherein said clamping member includes:
    a positioning bar shaft extending outwardly from said positioning bar; and
    a quick-release grip member having a body portion slidably mounted to said positioning bar shaft with a gripper portion for gripping said racket handle between said gripper portion and said positioning bar, and a handle member mounted to said body portion for rotation relative thereto, said handle member being spring-biased into a position wherein said positioning bar shaft is gripped by said handle member and said body portion.

31. A system as in claim 15, wherein said pendulum unit is mounted on said measuring unit.

32. A system as in claim 15, wherein said storage medium comprises a disc readable by a digital computer for programming said computer to respond to said operator commands.

33. A system as in claim 15, further comprises a custom chip set storing said program and one or more input devices for communicating said operator commands to said program.

34. A method for customizing a new sports implement using a digital computer having stored therein the weight of a reference sports implement and the location of the mass centroid of said reference sports implement as defined by the distance from a part of said reference sports implement to the mass centroid thereof, the method comprising the steps of:
    inputting to said digital computer from an electronic balance a first electrical signal representing the total weight of said new sports implement;
    inputting to said digital computer from an electronic balance a second electrical signal representing the weight on said balance when said new sports implement is supported by a first implement support on said balance and a second implement support disposed a predetermined distance from said first implement support and from said part of said new sports implement;
    calculating from said second electrical signal, said predetermined distances and said total weight the location of the mass centroid of said new sports implement as defined by the distance from said part of said new sports implement to the mass centroid thereof;
    comparing the total weight and mass centroid location of said new sports implement with the total weight and mass centroid location of said reference sports implement; and
    determining the amount and location of one or more weights for adding, if necessary, to said new sports implement to provide the same total weight and mass centroid location as said reference sports implement.

35. A method as in claim 34, wherein said digital computer has stored therein a moment of inertia of said reference sports implement, the method further comprising the steps of:
    inputting to said digital computer a third electrical signal representing a period of oscillation of said new sports implement suspended as a pendulum about an axis a known distance from said part of said new sports implement;
    calculating from said third electrical signal, said known distance and said total weight a moment of inertia of said new sports implement;
    comparing the total weight, mass centroid location and moment of inertia of said new sports implement with the total weight, mass centroid location and moment of inertia of said reference sports implement; and determining whether there is one or more locations where weight can be added to said new sports implement to provide the same total weight, mass centroid location and moment of inertia as said reference sports implement.

36. A method as in claim 34, said method using a measuring unit including said electronic balance, said first implement support, said second implement support and a reference member disposed a fixed distance from said second implement support for locating said part of said sports implement, the method further comprising the step of calibrating said measuring unit by:

providing a calibrating member having a known weight and mass centroid location as defined by the distance from a part of said calibrating member to the mass centroid thereof;

placing said calibrating member on said first and second implement supports with said part of said calibrating member being located using said reference member;

inputting to said digital computer from said balance said second electrical signal; and calculating from said second electrical signal and said known weight and mass centroid location of said calibrating member the distance between said first and second implement supports.

37. A method for customizing a new tennis racket using:

a digital computer having stored therein the weight of a reference tennis racket and the location of the mass centroid of said reference tennis racket as defined by the distance from the butt end of said reference tennis racket to the mass centroid thereof, and a measuring unit including:

an electronic balance mounted to said measuring unit for providing an electrical signal indicative of a weight placed on said balance, a forward racket support on said balance and having a sharp edge for supporting a portion of said new tennis racket remote from the handle thereof, a rear racket support with a sharp edge disposed a predetermined distance from said forward racket support for supporting said handle of said new tennis racket, and a reference member mounted for movement between an operative position in contact with the butt end of said handle for locating said butt end a predetermined distance from said front and rear racket supports and a retracted position out of contact with said butt end, the method comprising the steps of:

placing said new tennis racket on said balance;

inputting to said digital computer from an electronic balance a first electrical signal representing the total weight of said new tennis racket;

placing said new tennis racket on said forward and rear racket supports with said butt end of said handle in contact with said reference member;

moving said reference member to said retracted position;

inputting to said digital computer from said balance a second electrical signal representing the weight on said balance when said new tennis racket is supported by said forward and rear racket supports with said reference member in the retracted position thereof;

calculating from said second electrical signal, said predetermined distances and said total weight the location of the mass centroid of said new tennis racket as defined by the distance from said butt end of said new tennis racket to the mass centroid thereof;

comparing the total weight and mass centroid location of said new tennis racket with the total weight and mass centroid location of said reference tennis racket; and determining whether there is one or more locations where weight can be added to said new tennis racket to provide the same total weight and mass centroid location as said reference tennis racket.

38. A method as in claim 37, further comprising the steps of:

completing said new tennis racket by adding weights thereto in accordance with the results of said determining step;

placing said completed new tennis racket on said balance;

inputting to said digital computer from said balance a first electrical signal representing the total weight of said completed new tennis racket;

placing said completed new tennis racket on said forward and rear racket supports with said butt end of said handle in contact with said reference member;

moving said reference member to said retracted position;

inputting to said digital computer from said balance a second electrical signal representing the weight on said balance when said completed new tennis racket is supported by said forward and rear racket supports with said reference member in the retracted position thereof;

calculating from said second electrical signal, said predetermined distances and said total weight the location of the mass centroid of said completed new tennis racket as defined by the distance from said butt end of said new tennis racket to the mass centroid thereof; and comparing the total weight and mass centroid location of said completed new tennis racket with the total weight and mass centroid location of said reference tennis racket.

39. A method as in claim 37, using:

a pendulum unit including:

a pendulum bracket mounted for rotation about a pendulum shaft, said pendulum bracket including a positioning bar and a clamping member for clamping said handle of said new tennis racket in place against said positioning bar for oscillation of said new tennis racket as a pendulum about said shaft, a positioning plate movable between an operative position in contact with said butt end of said handle for locating said butt end a predetermined distance from said pendulum shaft and a retracted position out of contact with said butt end for permitting said new tennis racket to oscillate about said shaft as a pendulum, and an output device for providing an electrical signal indicative of the period of oscillation of said new tennis racket about said shaft, wherein said digital computer has stored therein a moment of inertia of said reference tennis racket about an axis where said reference racket is normally gripped during play therewith, the method further comprising the steps of:

placing said new tennis racket in said pendulum bracket with said butt end of said handle in contact with said positioning plate;

moving said positioning plate to said retracted position;

inputting to said digital computer from said output device a third electrical signal representing a period of oscillation of said new tennis racket suspended as a pendulum in said pendulum bracket;

calculating from said third electrical signal, said predetermined distance, said known distance and said total weight the moment of inertia of said new tennis racket about an axis through the center of the player's grip;

comparing the total weight, mass centroid location and moment of inertia of said new tennis racket with the total weight, mass centroid location and moment of inertia of said reference tennis racket; and determining whether there is one or more locations where weight can be added to said new tennis racket to provide the same total weight, mass centroid location and moment of inertia as said reference tennis racket.

40. A method as in claim 39, further comprising the steps of:

completing said new tennis racket by adding weight thereto in accordance with the results of said determining step;

placing said completed new tennis racket in said pendulum bracket with said butt end of said handle in contact with said positioning plate;

moving said positioning plate to said retracted position;

inputting to said digital computer from said output device a third electrical signal representing a period of oscillation of said completed new tennis racket suspended as a pendulum in said pendulum bracket;

calculating from said third electrical signal, said predetermined distance, said known distance and said total weight the moment of inertia of said completed new tennis racket about an axis through the center of the player's grip; and comparing the total weight, mass centroid location and moment of inertia of said completed new tennis racket with the total weight, mass centroid location and moment of inertia of said reference tennis racket.

41. A method for measuring a tennis racket using:

a digital computer, and a measuring unit including:
  an electronic balance mounted to said measuring unit for providing an electrical signal indicative of a weight placed on said balance,
  a forward racket support on said balance and having a sharp edge for supporting a portion of said tennis racket remote from the handle thereof,
  a rear racket support with a sharp edge disposed a predetermined distance from said forward racket support for supporting said handle of said tennis racket, and
  a reference member mounted for movement between an operative position in contact with the butt end of said handle for locating said butt end a predetermined distance from said front and rear racket supports and a retracted position out of contact with said butt end, the method comprising the steps of:

placing said tennis racket on said balance;

inputting to said digital computer from an electronic balance a first electrical signal representing the total weight of said tennis racket;

placing said tennis racket on said forward and rear racket supports with said butt end of said handle in contact with said reference member;

moving said reference member to said retracted position;

inputting to said digital computer from said balance a second electrical signal representing the weight on said balance when said tennis racket is supported by said forward and rear racket supports with said reference member in the retracted position thereof; and calculating from said second electrical signal, said predetermined distances and said total weight the location of the mass centroid of said tennis racket as defined by the distance from said butt end of said new tennis racket to the mass centroid thereof.

42. A method as in claim 41, using:

a pendulum unit including:
  a pendulum bracket mounted for rotation about a pendulum shaft, said pendulum bracket including a positioning bar and a clamping member for clamping said handle of said tennis racket in place against said positioning bar for oscillation of said tennis racket as a pendulum about said shaft,
  a positioning plate movable between an operative position in contact with said butt end of said handle for locating said butt end a predetermined distance from said pendulum shaft and a retracted position out of contact with said butt end for permitting said tennis racket to oscillate about said shaft as a pendulum, and
  an output device for providing an electrical signal indicative of the period of oscillation of said tennis racket about said shaft, the method further comprising the steps of:

placing said tennis racket in said pendulum bracket with said butt end of said handle in contact with said positioning plate;

moving said positioning plate to said retracted position;

inputting to said digital computer from said output device a third electrical signal representing a period of oscillation of said tennis racket suspended as a pendulum in said pendulum bracket; and calculating from said third electrical signal, said predetermined distance, said known distance and said total weight the moment of inertia of said tennis racket about an axis through the center of the player's grip.

* * * * *